United States Patent
Chiu et al.

(10) Patent No.: US 12,549,743 B2
(45) Date of Patent: Feb. 10, 2026

(54) CANDIDATE REORDERING FOR MERGE MODE WITH MOTION VECTOR DIFFERENCE

(71) Applicant: MEDIATEK INC., Hsinchu (TW)

(72) Inventors: Chih-Yao Chiu, Hsinchu (TW);
Chun-Chia Chen, Hsinchu (TW);
Chih-Wei Hsu, Hsinchu (TW);
Ching-Yeh Chen, Hsinchu (TW);
Tzu-Der Chuang, Hsinchu (TW);
Yu-Wen Huang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 58 days.

(21) Appl. No.: 18/684,245

(22) PCT Filed: Aug. 15, 2022

(86) PCT No.: PCT/CN2022/112551
§ 371 (c)(1),
(2) Date: Feb. 16, 2024

(87) PCT Pub. No.: WO2023/020444
PCT Pub. Date: Feb. 23, 2023

(65) Prior Publication Data
US 2025/0150601 A1    May 8, 2025

Related U.S. Application Data

(60) Provisional application No. 63/318,802, filed on Mar. 11, 2022, provisional application No. 63/233,346, filed on Aug. 16, 2021.

(51) Int. Cl.
*H04N 19/176* (2014.01)
*G06V 10/75* (2022.01)
*H04N 19/513* (2014.01)

(52) U.S. Cl.
CPC ......... *H04N 19/176* (2014.11); *G06V 10/751* (2022.01); *H04N 19/513* (2014.11)

(58) Field of Classification Search
None
See application file for complete search history.

(56) References Cited

U.S. PATENT DOCUMENTS

| | | |
|---|---|---|
| 10,701,390 B2 | 6/2020 | Li et al. |
| 10,701,393 B2 | 6/2020 | Chen |

(Continued)

FOREIGN PATENT DOCUMENTS

| | | |
|---|---|---|
| CN | 103891283 A | 6/2014 |
| CN | 110383839 A | 10/2019 |

(Continued)

OTHER PUBLICATIONS

International Search Report and Written Opinion dated Nov. 15, 2022, issued in application No. PCT/CN2022/112566.

(Continued)

*Primary Examiner* — Jessica M Prince
(74) *Attorney, Agent, or Firm* — McClure, Qualey & Rodack, LLP

(57) ABSTRACT

A video coding system that reorders prediction candidates is provided. A video coder receives data for a block of pixels to be encoded or decoded as a current block of a current picture of a video. The video coder identifies possible candidate prediction positions. The video coder computes a cost for each of the identified possible candidate prediction positions. The video coder assigns, based on the computed costs, a reordered index to each of N lowest cost candidate prediction positions from the identified possible candidate prediction positions. The video coder selects a candidate prediction position using the assigned reordered indices, wherein the selection is signaled in or parsed from the (Continued)

bitstream. The video coder encodes or decodes the current block by using the selected candidate prediction position.

13 Claims, 19 Drawing Sheets

(56) References Cited

U.S. PATENT DOCUMENTS

| | | | |
|---|---|---|---|
| 10,869,043 | B2 | 12/2020 | Xu et al. |
| 10,917,636 | B2 | 2/2021 | Li et al. |
| 11,159,788 | B2 | 10/2021 | Chen et al. |
| 11,570,461 | B2 | 1/2023 | Jeong et al. |
| 11,616,945 | B2 | 3/2023 | Zhang et al. |
| 11,627,326 | B2 | 4/2023 | Park et al. |
| 11,856,240 | B1 | 12/2023 | Kirchhoffer et al. |
| 11,876,964 | B2 | 1/2024 | De Luxan Hernandez et al. |
| 2009/0232215 | A1 | 9/2009 | Park |
| 2011/0002388 | A1 | 1/2011 | Karczewicz |
| 2012/0281752 | A1 | 11/2012 | Zheng |
| 2017/0339404 | A1 | 11/2017 | Panusopone |
| 2017/0353730 | A1 | 12/2017 | Liu |
| 2018/0241993 | A1 | 8/2018 | Panusopone et al. |
| 2018/0376160 | A1 | 12/2018 | Zhang et al. |
| 2019/0281285 | A1 | 9/2019 | Piao et al. |
| 2020/0068218 | A1* | 2/2020 | Chen ............... H04N 19/82 |
| 2020/0244968 | A1 | 7/2020 | Jun |
| 2020/0374513 | A1* | 11/2020 | Xiu ............... H04N 19/64 |
| 2020/0396476 | A1 | 12/2020 | Furht |
| 2020/0404289 | A1 | 12/2020 | Li et al. |
| 2021/0014522 | A1* | 1/2021 | Jung ............... H04N 19/593 |
| 2021/0037238 | A1* | 2/2021 | Park ............... H04N 19/105 |
| 2021/0037256 | A1 | 2/2021 | Zhang et al. |
| 2021/0044821 | A1 | 2/2021 | Galpin et al. |
| 2021/0120262 | A1* | 4/2021 | Chen ............... H04N 19/176 |
| 2021/0185347 | A1 | 6/2021 | Liu et al. |
| 2021/0195245 | A1 | 6/2021 | Li et al. |
| 2021/0250580 | A1 | 8/2021 | Chen et al. |
| 2022/0150507 | A1* | 5/2022 | Lin ............... H04N 19/577 |
| 2022/0329822 | A1 | 10/2022 | Chang |
| 2024/0267533 | A1* | 8/2024 | Zhang ............... H04N 19/154 |

FOREIGN PATENT DOCUMENTS

| | | |
|---|---|---|
| CN | 110708541 A | 1/2020 |
| CN | 110876063 A | 3/2020 |
| CN | 110933423 A | 3/2020 |
| CN | 110944170 A | 3/2020 |
| CN | 112313952 A | 2/2021 |
| CN | 112385228 A | 2/2021 |
| EP | 3 443 746 A1 | 2/2019 |
| TW | 202007158 A | 2/2020 |
| TW | 202011355 A | 3/2020 |
| WO | 2017/201141 A1 | 11/2017 |
| WO | 2020/049447 A1 | 3/2020 |
| WO | 2020/076097 A1 | 4/2020 |
| WO | 2020/084460 A1 | 4/2020 |
| WO | 2020182216 A1 | 9/2020 |

OTHER PUBLICATIONS

Chinese language office action dated Jan. 31, 2023, issued in application No. TW 111130760.

International Search Report and Written Opinion dated Nov. 10, 2022, issued in application No. PCT/CN2022/112154.

Chinese language office action dated May 4, 2023, issued in application No. TW 111130543.

Chinese language office action dated Nov. 22, 2023, issued in application No. TW 111130543.

Lie, W.N., et al.; "Video Error Concealment by Integrating Greedy Suboptimization and Kalman Filtering Techniques;" IEEE Transactions on Circuits and Systems for Video Technology; vol. 16; No. 8; Aug. 2006; pp. 1-11.

International Search Report and Written Opinion dated Nov. 15, 2022, issued in application No. PCT/CN2022/112551.

Chinese language office action dated May 12, 2023, issued in application No. TW 111130761.

Non-Final Office Action issued in U.S. Appl. No. 18/684,236 filed Feb. 16, 2024 mailed May 12, 2025.

EP Search Report dated Jun. 3, 2025 in application No. 22857756.5-1207.

Esenlik, S., et al.; "Description of Core Experiment 9 (CE9): Decoder Side Motion Vector Derivation" (published on May 14, 2018).

Chen, H., et al.; "Description of SDR, HDR and 360° video coding technology proposal by Huawei, GoPro, HiSilicon, and Samsung" (published on Apr. 14, 2018).

An, J., et al.; "Enhanced Merge Mode based on JEM7.0" (retrieved on Apr. 15, 2018).

* cited by examiner

CANDIDATE REORDERING FOR MERGE MODE WITH MOTION VECTOR DIFFERENCE

CROSS REFERENCE TO RELATED PATENT APPLICATION(S)

The present disclosure is part of a non-provisional application that claims the priority benefit of U.S. Provisional Patent Application No. 63/233,346, filed on 16 Aug. 2021, and of U.S. Provisional Patent Application No. 63/318,802, filed on 11 Mar. 2022. Content of above-listed applications are herein incorporated by reference.

TECHNICAL FIELD

The present disclosure relates generally to video coding. In particular, the present disclosure relates to methods of ordering candidates for Merge Mode with Motion Vector Difference (MMVD).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To increase the coding efficiency of motion vector (MV) coding in HEVC, HEVC has the Skip, and Merge mode. Skip and Merge modes obtain the motion information from spatially neighboring blocks (spatial candidates) or a temporal co-located block (temporal candidate). When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged prediction unit (PU) reuses the MV, prediction direction, and reference picture index of the selected candidate.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a video coding system that reorders prediction candidates. A video coder receives data for a block of pixels to be encoded or decoded as a current block of a current picture of a video. The video coder identifies possible candidate prediction positions. The video coder computes a cost for each of the identified possible candidate prediction positions. The video coder assigns, based on the computed costs, a reordered index to each of N lowest cost candidate prediction positions from the identified possible candidate prediction positions. The video coder selects a candidate prediction position using the assigned reordered indices, wherein the selection is signaled in the bitstream. The video coder encodes or decodes the current block by using the selected candidate prediction position. In some embodiments, N is an integer greater than one but less than a total number of the identified possible candidate prediction positions such that only a subset of the possible candidate prediction positions identified, thereby reducing the number of bits needed for coding or signaling.

In some embodiments, each candidate prediction position is a refinement position that refines a merge candidate or starting MV by specifying a direction and a distance relative to the merge candidate. In some embodiments, the encoder identifies the possible candidate prediction positions by finding a particular refinement position having a lowest cost among refinement positions at a particular distance or direction from the merge candidate and by identifying a set of refinement positions that neighbor the particular refinement position as the possible candidate prediction positions. The particular distance or direction may be provided by a video encoder in the bitstream.

The cost of a candidate prediction position may be computed by matching a template of the current block and a template of a reference block that is referenced by the candidate prediction position. The template of a pixel block includes pixels to the top and to the left of the pixel block.

In some embodiments in which the candidate prediction positions are refinement positions of MMVD, the selection signaled in the bitstream may specify a reordered index for the distance or a reordered index for the direction.

In some embodiments, the selection being signaled includes (i) a group index specifying a selected group of multiple groups of candidate refinement positions and (ii) one or more indices (e.g., a direction index and/or a distance index) specifying a selected candidate refinement position within the selected group. In some embodiments, all of the identified possible candidate prediction positions belong to the selected group of candidate refinement positions. The reordered indices are assigned to N lowest cost candidate refinement positions of the selected group, and the one or more indices specifying the selected candidate refinement position within the selected group include a reordered index. The different groups of candidate refinement positions may have different number of member candidate refinement positions.

In some embodiments, each identified possible candidate prediction position is a representative candidate refinement position of a different group of candidate refinement positions. The reordered indices are assigned to N groups respectively having N lowest cost representative candidate refinement positions, N being less than or equal to a total number of groups in the plurality of groups of candidate refinement positions. The group index specifying the selected group of candidate refinement positions is a reordered index. Each group in the multiple groups of candidate refinement positions has a same numbers of member candidate refinement positions.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Candidate Reordering for Merge Mode

Figure 1:
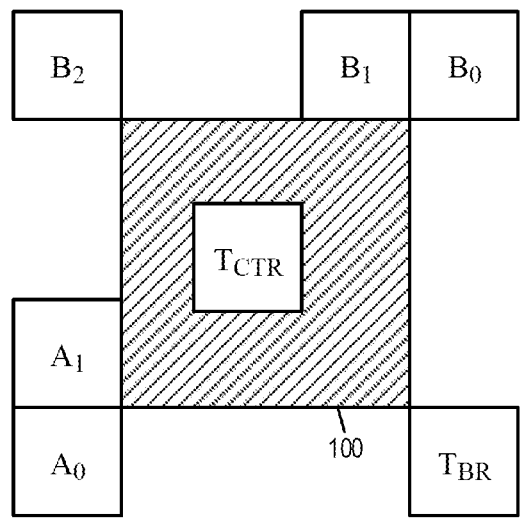
FIG. 1 illustrates the motion candidates of merge mode.

FIG. 1 illustrates the motion candidates of merge mode. The figure shows a current block 100 of a video picture or frame being encoded or decoded by a video codec. As illustrated, up to four spatial MV candidates are derived from spatial neighbors A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip, or Merge modes based on the rate-distortion optimization (RDO) decision, and transmits the index to a video decoder. (Skip mode and merge mode are collectively referred to as "merge mode" in this document.)

For some embodiments, merge candidates are defined as the candidates of a general "prediction+merge" algorithm framework. The "prediction+merge algorithm framework has a first part and a second part. The first part generating a candidate list (a set) of predictors that are derived by inheriting neighboring information or refining or processing neighboring information. The second part is sending (i) a merge index to indicate which inheriting neighbor in the candidate list is selected and (ii) some side information related to the merge index. In other words, the encoder signals the merge index and some side information for the selected candidate to the decoder.

Figure 2:
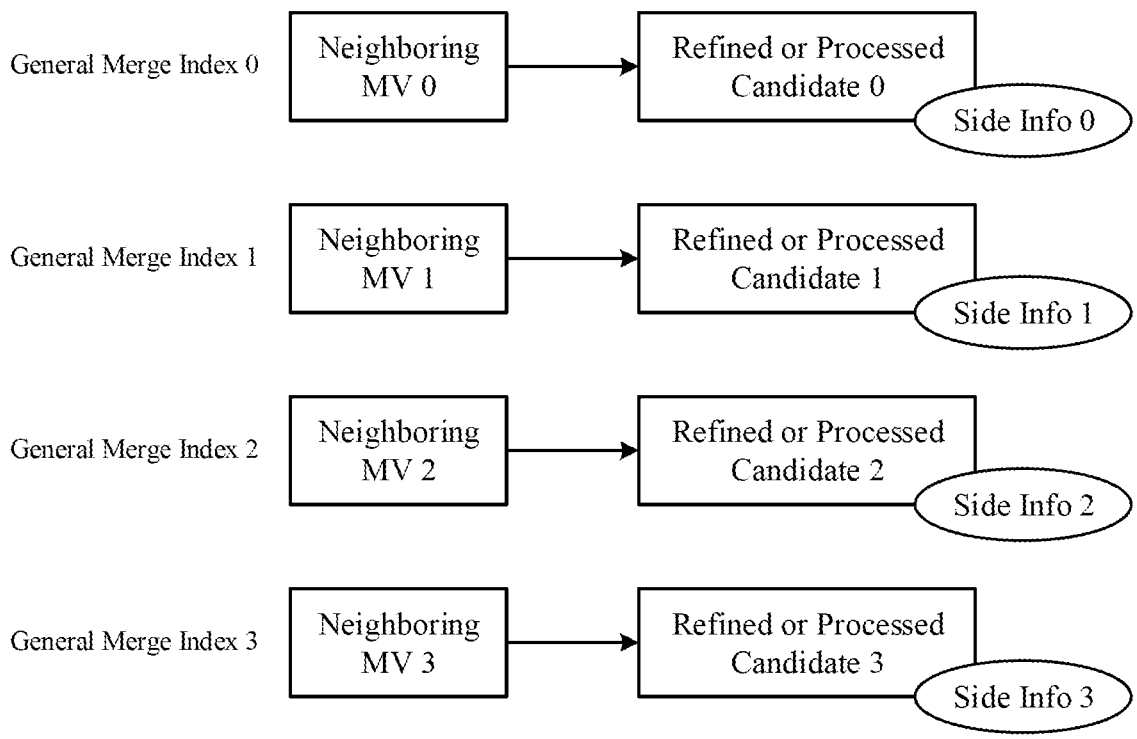
FIG. 2 conceptually illustrates the "prediction+merge" algorithm framework for merge candidates.

FIG. 2 conceptually illustrates the "prediction+merge" algorithm framework for merge candidates. The candidate list includes many candidates that inherit neighboring information. The inherited information is then processed or refined to form new candidates. During the processes, some side information for the candidates is generated and sent to decoder.

Video coders (encoders or decoders) may process merge candidates in different ways. Firstly, in some embodiments, a video coder may combine two or more candidates into one candidate. Secondly, in some embodiments, a video coder may use the original candidate to be original MV predictor and perform motion estimation searching using current block pixels to find a final MVD (Motion Vector Difference), where the side information is the MVD. Thirdly, in some embodiments, a video coder may use the original candidate to be the original MV predictor and perform motion estimation searching using current block pixels to find a final MVD for L0, and, for L1 predictor, and the L1 predictor is the original candidate. Fourthly, in some embodiments, a video coder may use the original candidate to be original MV predictor and perform motion estimation searching using current block pixels to find a final MVD for L1, and L0 predictor is the original candidate. Fifthly, in some embodiments, a video coder may use the original candidate to be original MV predictor and do MV refinement searching using top or left neighboring pixels as searching template to find a final predictor. Sixthly, a video coder may use the original candidate to be original MV predictor and perform MV refinement searching using bi-lateral template (pixels on L0 and L1 reference pictures pointed by candidate MV or mirrored MV) as searching template to find a final predictor.

For this document, the term "merge candidate" or "candidate" means the candidate in the general "prediction+merge" algorithm framework. The "prediction+merge" algorithm framework is not restricted to the previous described embodiments. Any algorithm having "prediction+ merge index" behavior all belongs to this framework.

In some embodiments, a video coder reorders the merge candidates, i.e., the video coder modifies the candidate order inside the candidate list to achieve better coding efficiency. The reorder rule depends on some pre-calculation for the current candidates (merge candidates before the reordering), such as upper neighbor condition (modes, MVs and so on) or left neighbor condition (modes, MVs and so on) of the current CU, the current CU shape, or up/left L-shape template matching.

Figure 3:
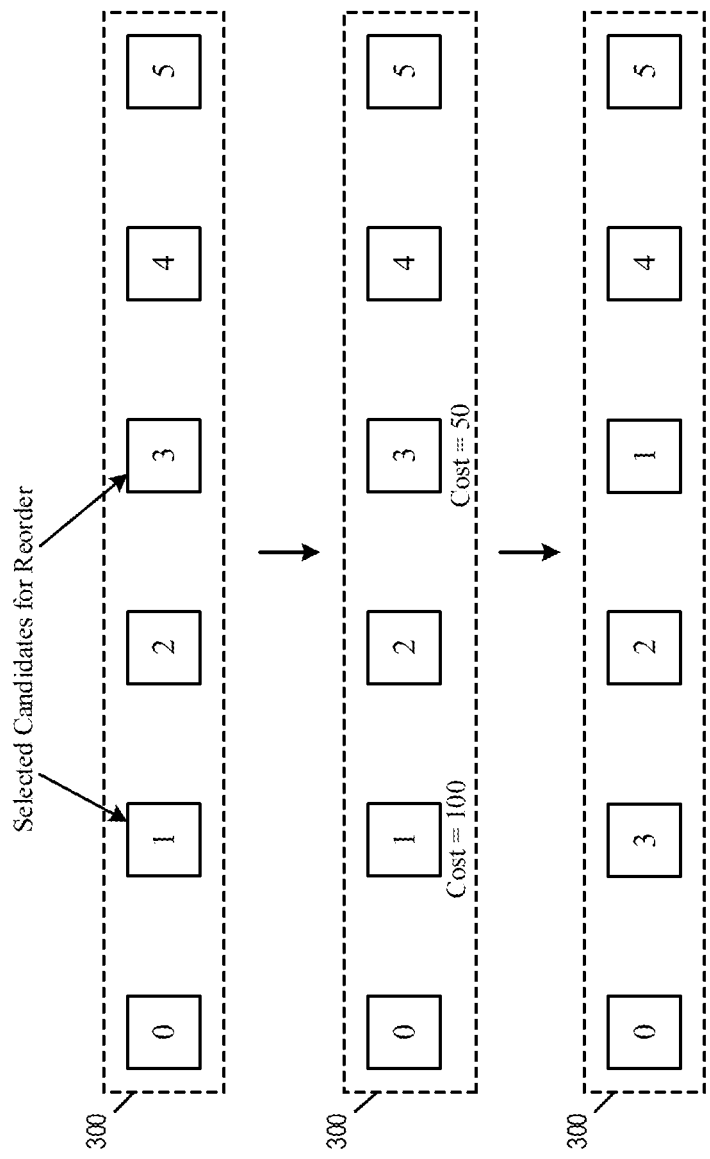
FIG. 3 conceptually illustrates an example candidate reordering.

FIG. 3 conceptually illustrates an example candidate reordering. As illustrated, an example merge candidate list 300 has six candidates labeled '0' through '5'. The video coder initially selects some candidates (candidates labeled '1' and '3') for reordering. The video coder then pre-calculates the cost of those candidates (100 and 50 for candidates labeled '1' and '3' respectively). The cost is named as the guess-cost of the candidate, the lower the cost means the better the candidate. Finally, the video coder reorders the selected candidates by moving lower cost candidates (the candidate labeled '3') to the front of the list.

In general, for a merge candidate Ci having an order position Oi in the merge candidate list (with i=0~N−1, N is total number of candidates in the list, Oi=0 means Ci is at the beginning of the list and Oi=N−1 means Ci is at the end of the list), with Oi=i (C0 order is 0, C1 order is 1, C2 order is 2, ... and so on), the video coder reorders merge candidates in the list by changing the Oi for Ci for selected values of i (changing the order of some selected candidates).

In some embodiments, Merge Candidate Reordering can be turned off according to the size or shape of the current PU. The video coder may pre-define several PU sizes or shapes for turning-off Merge Candidate Reordering. In some embodiments, other conditions are involved for turning off the Merge Candidate Reordering, such as picture size, QP value, and so on, being certain predefined values. In some embodiments, the video coder may signal a flag to switch on or off Merge Candidate Reordering. For example, a flag (e.g. "merge_cand_rdr_en") may be signaled to indicate whether "Merge Candidate Reorder" is enabled (value 1: enabled, value 0: disabled). When not present, the value of merge_cand_rdr_en is inferred to be 1. The minimum sizes of units in the signaling, merge_cand_rdr_en, can also be separately coded in sequence level, picture level, slice level, or PU level.

Generally, a video coder performing candidate reordering by (1) identifying one or more candidates for reordering, (2) calculating a guess-cost for each identified candidate, and (3) reordering the candidates according to the guess-costs of the selected candidates. In some embodiments, the calculated guess-costs of some of the candidates are adjusted (cost adjustment) before the candidates are reordered.

In some embodiments, the step of selecting one or more candidates can be performed by several different methods. In some embodiments, the video coder selects all candidates with merge_index≤threshold. The threshold is a pre-defined value, and the merge_index is the original order inside the merge list (merge_index is 0, 1, 2, ... ). For example, if the original order of the current candidate is at the beginning of the merge list, the merge_index=0 (for the current candidate).

In some embodiments, the video coder selects candidates for reordering according to the candidate type. The candidate type is the candidate category of all candidates. The video coder firstly categorizes all candidates into MG types, (MG=1 or 2 or 3 or other value), then, it selects MG_S (MG_S=1, 2, 3 ... , MG_S≤MG) types from all MG types for reordering. An example of categorization is to categorize all candidates into 4 candidate types. Type 1 is a candidate of spatial neighboring MV. Type 2 is a candidate of temporal neighboring MV. Type 3 is all sub-PU candidate (such as Sub-PU TMVP, STMVP, Affine merge candidate). Type 4 is all other candidates. In some embodiments, the video coder selects a candidate according to both merge_index and candidate type.

In some embodiments, a L-shape matching method is used for calculating the guess-costs of selected candidates. For the currently selected merge candidate, the video coder retrieves a L-shape template of current picture and a L-shape template of reference picture and compares the difference between the two templates. The L-shape matching method has two parts or steps: (i) identifying the L-shape templates and (ii) matching the derived templates.

Figure 4:
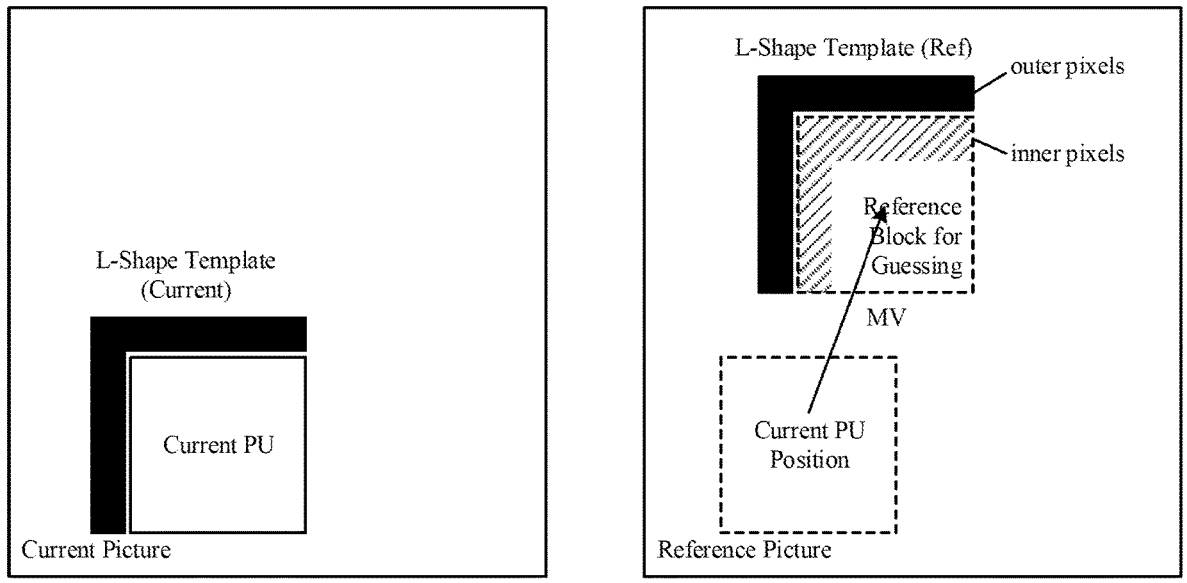
FIGS. 4-5 conceptually illustrates the L-shape matching method for calculating the guess-costs of selected candidates.
Figure 5:
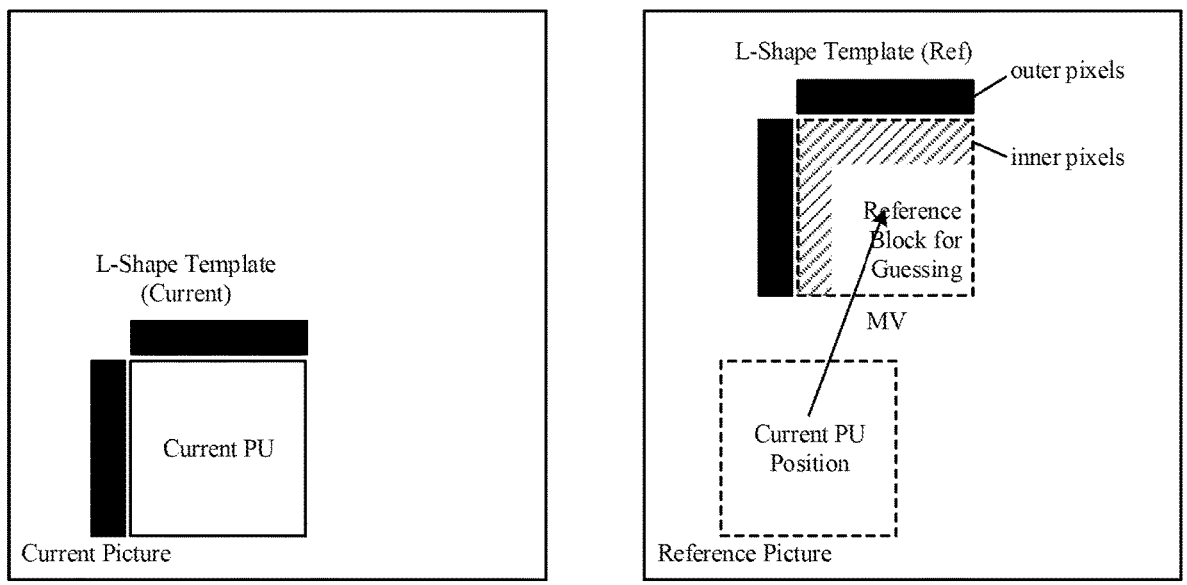

FIGS. 4-5 conceptually illustrates the L-shape matching method for calculating the guess-costs of selected candidates. FIG. 4 shows a L-shape template of the current picture that includes some pixels around top and left boundaries of current PU. The L-shape template of reference picture includes some pixels around top and left boundaries of reference_block_for_guessing for current merge candidate. The reference_block_for_guessing (with width BW and height BH same as current PU) is the block pointed by integer part of the motion vector of the current merge candidate.

Different embodiments define the L-shape template differently. In some embodiments, all pixels of L-shape template are outside the reference_block_for_guessing (as "outer pixels" label in FIG. 4). In some embodiments, all pixels of L-shape template are inside the reference_block_for_guessing (as "inner pixels" label in FIG. 4). In some embodiments, some pixels of L-shape template are outside the reference_block_for_guessing and some pixels of L-shape template are inside the reference_block_for_guessing. FIG. 5 shows a L-shape template of the current picture that is similar to that of FIG. 4 but has no left-top corner pixels, and the L-shape template of the reference picture (of outer pixel embodiment) has no left-top corner pixels.

In some embodiments, the L-shaped matching method and the corresponding L-shape template (named template_std) is defined according to the following: assuming the width of current PU is BW, and height of current PU is BH, the L-shape template of current picture has a top part and a left part. Defining top thick=TTH, left thick=LTH, then, the top part includes all current picture pixels of coordinate (ltx+tj, lty−ti), in which ltx is the Left-top integer pixel horizontal coordinate of the current PU, lty is the Left-top integer pixel vertical coordinate of the current PU, ti is an index for pixel lines (ti is 0~(TTH−1)), tj is a pixel index in a line (tj is 0~BW−1). For the left part, it includes all current picture pixels of coordinate (ltx−tjl, lty+til), in which ltx is the Left-top integer pixel horizontal coordinate of the current PU, lty is the Left-top integer pixel vertical coordinate of the current PU, til is a pixel index in a column (til is 0~(BH−1)), tjl is an index of columns (tjl is 0~(LTH−1)).

In template_std, the L-shape template of reference picture has a top part and a left part. Defining top thick=TTHR, left thick=LTHR, then, top part includes all reference picture pixels of coordinate (ltxr+tjr, ltyr−tir+shifty), in which ltxr is the Left-top integer pixel horizontal coordinate of the reference_block_for_guessing, ltyr is the Left-top integer pixel vertical coordinate of the reference_block_for_guessing, tir is an index for pixel lines (tir is 0~(TTHR−1)), tjr is a pixel index in a line (tjr is 0~BW−1), shifty is a pre-define shift value. For the left part, it consists of all reference picture pixels of coordinate (ltxr−tjlr+shiftx, ltyr+tilr), in which ltxr is the Left-top integer pixel horizontal coordinate of the reference_block_for_guessing, ltyr is the Left-top integer pixel vertical coordinate of the reference_block_for_guessing, tilr is a pixel index in a column (tilr is 0~(BH−1)), tjlr is an index of columns (tjlr is 0~ (LTHR-1)), shiftx is a pre-define shift value.

There is one L-shape template for reference picture if the current candidate only has L0 MV or only has L1 MV. But there are 2 L-shape templates for the reference picture if the current candidate has both L0 and L1 MVs (bi-direction candidate), one template is pointed to by the L0 MV and L0 reference picture, the other template is pointed by L1 MV and L1 reference picture.

In some embodiments, for the L-shape template, the video coder has an adaptive thickness mode. The thickness is defined as the number of pixel rows for the top part in L-shape template or the number of pixel columns for the left part in L-shape template. For the previously mentioned L-shape template template_std, the top thickness is TTH and left thickness is LTH in the L-shape template of current picture, and the top thickness is TTHR and left thickness is LTHR in the L-shape template of reference picture. The adaptive thickness mode changes the top thickness or left thickness depending on some conditions, such as the current PU size or the current PU shape (width or height) or the QP of current slice. For example, the adaptive thickness mode can let top thickness=2 if current PU height≥32, and top thickness=1 if current PU height<32.

When performing L-shape template matching, the video coder retrieves the L-shape template of current picture and L-shape template of reference picture, and compares (matches) the difference between the two templates. The difference (e.g., Sum of Absolute Difference, or SAD) between the pixels in the two templates is used as the cost of the MV. In some embodiments, the video coder may obtain the selected pixels from the L-shape template of the current picture and the selected pixels from the L-shape template of reference picture before computing the difference between the selected pixels of the two L-shape templates.

II. Candidate Reordering for MMVD

Merge Mode with Motion Vector Difference (MMVD) is a new coding tool for the Versatile Video Coding (VVC) standard. Unlike regular merge mode in which the implicitly derived motion information is directly used for prediction samples generation of the current CU, in MMVD, the derived motion information is further refined by a motion vector difference (MVD). MMVD also extends the list of candidates for merge mode by adding additional MMVD candidates that are refinement positions based on predefined offsets (also referred to as MMVD offsets). Each refinement position is therefore also a candidate prediction position. A MMVD flag may be signaled after sending a skip flag and merge flag to specify whether MMVD mode is used for a CU.

If MMVD mode is used, a selected merge candidate is refined by MVD information. The MVD information includes a motion magnitude information (mmvd_distance_idx, or distance index) and a motion direction information (mmvd_direction_idx, or direction index). The motion magnitude information includes an offset that is to be added to either the horizontal component or vertical component of the starting MV (merge candidate). The motion direction information includes the direction of the MVD relative to the starting point.

Figure 6:
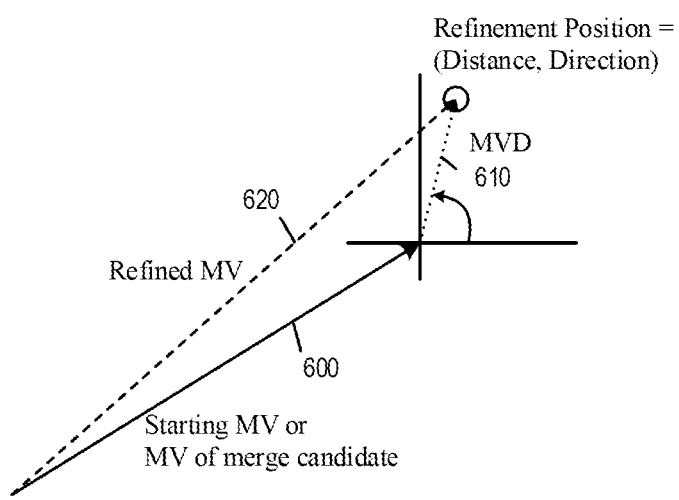
FIG. 6 conceptually illustrates the refinement of a starting MV by an MVD.

FIG. 6 conceptually illustrates the refinement of a starting MV 600 by a MVD 610. The starting MV 600 may be the selected merge candidate. The MVD 610 is defined by a refinement position having a direction and a distance (relative to the merge candidate). The starting MV 600 is refined by the MVD 610 to create a refined MV 620 for predicting current block. The distance information can be coded by mmvd_distance_idx, or distance index. The direction information can be coded by mmvd_direction_idx, or direction index.

The MVD information include a merge candidate flag, the distance index to specify motion magnitude, and the direction index for indication of motion direction. The merge candidate flag is signaled to specify which of the first two merge candidates is to be used as a starting MV. The distance index is used to specify motion magnitude information by indicating a pre-defined offset from the starting MV. The offset may be added to either horizontal component or vertical component of the starting MV. An example mapping from the distance index to the pre-defined offset is specified in Table II-1 below:

TABLE II-1

| Distance Index | | | | | | | | |
|---|---|---|---|---|---|---|---|---|
| Distance Index | 0 | 1 | 2 | 3 | 4 | 5 | 6 | 7 |
| Offset (in unit of luma sample) | 1/4 | 1/2 | 1 | 2 | 4 | 8 | 16 | 32 |

The direction index represents the direction of the MVD relative to the starting point. The direction index can represent one of the four directions as shown in Table II-2.

TABLE II-2

| Sign of MV offset specified by direction index | | | | |
|---|---|---|---|---|
| Direction Index | 00 | 01 | 10 | 11 |
| x-axis | + | − | N/A | N/A |
| y-axis | N/A | N/A | + | − |

It's noted that the meaning of MVD sign may vary according to the information of the starting MV. When the starting MV is an un-prediction MV or a bi-prediction MV with both lists pointing to the same side of the current picture (i.e., picture order counts or POCs, of the two reference pictures are both larger than the POC of the current picture, or are both smaller than the POC of the current picture), the sign in Table II-2 specifies the sign of MV offset added to the starting MV. When the starting MVs is bi-prediction MVs with the two MVs point to the different sides of the current picture (i.e. the POC of one reference is larger than the POC of the current picture, and the POC of the other reference is smaller than the POC of the current picture), each sign in Table II-2 specifies the sign of the MV offset added to the list0 MV component of starting MV, and the sign for the list1 MV has opposite value. In some embodiments, a predefined offset (MmvdOffset) of a MMVD candidate is derived from or expressed as a distance value (MmvdDistance) and a directional sign (MmvdSign).

In some embodiments, the video coder performs candidate reordering for refinement positions for MMVD, or more generally candidate prediction positions, according to the following steps: (1) identifying possible refinement positions, (2) reordering refinement positions based on cost in ascending order, the cost computed by template matching or bilateral matching, and (3) choosing the top N refinement positions with the lowest costs as the available refinement position, N being less than or equal to the number of the possible refinement positions identified in step (1). This reduces the number of refinement positions in the list of MMVD candidates to only a subset of the possible refinement positions, thereby reducing the number of bits needed for coding or signaling the distance index (mmvd_distance_idx) and/or the direction index (mmvd_direction_idx).

As discussed above, the first step in performing candidate reordering is identifying possible or permissible refinement positions. Generally, each refinement position can be denoted as a pair of refinement direction and refinement distance, i.e., {(direction, distance)}. In some embodiments, the possible refinement positions {(direction, distance)} identified in the first step include those with directions or angles in the set {n/8*π}, n ranges from 0 to 15, and distances with distance in the set {¼-pel, ½-pel, 1-pel, 4-pel, 8-pel, 16-pel, 32-pel, 64-pel, 128-pel}.

Figure 7:
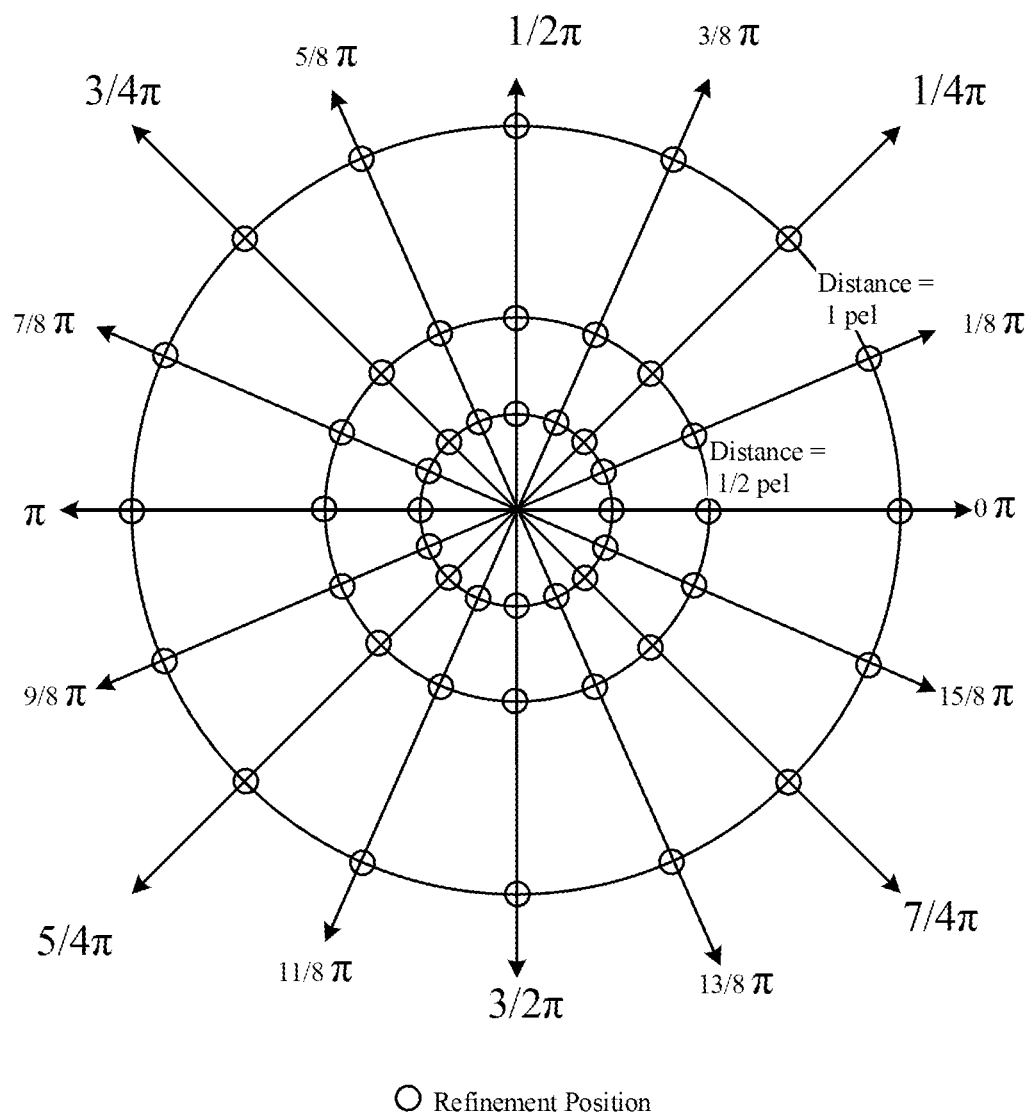
FIG. 7 conceptually illustrates a full set of refinement positions of different directions and distances, for which the costs are computed.

FIG. 7 conceptually illustrates a full set of refinement positions of different directions and distances, for which the costs are computed. The video encoder and the video decoder may each identify a list of N lowest cost refinement positions (i.e., the refinement positions that result in MVs with the lowest costs by template or bilateral matching) and assign indices to those lowest cost refinement positions according to a cost-based reordering. The video encoder may signal the selection of a refinement position to the decoder by using the reordered indices. The selection of the refinement position may be signaled in a bitstream as mmvd_distance_idx and mmvd_direction_idx but with fewer bits.

Figure 8:
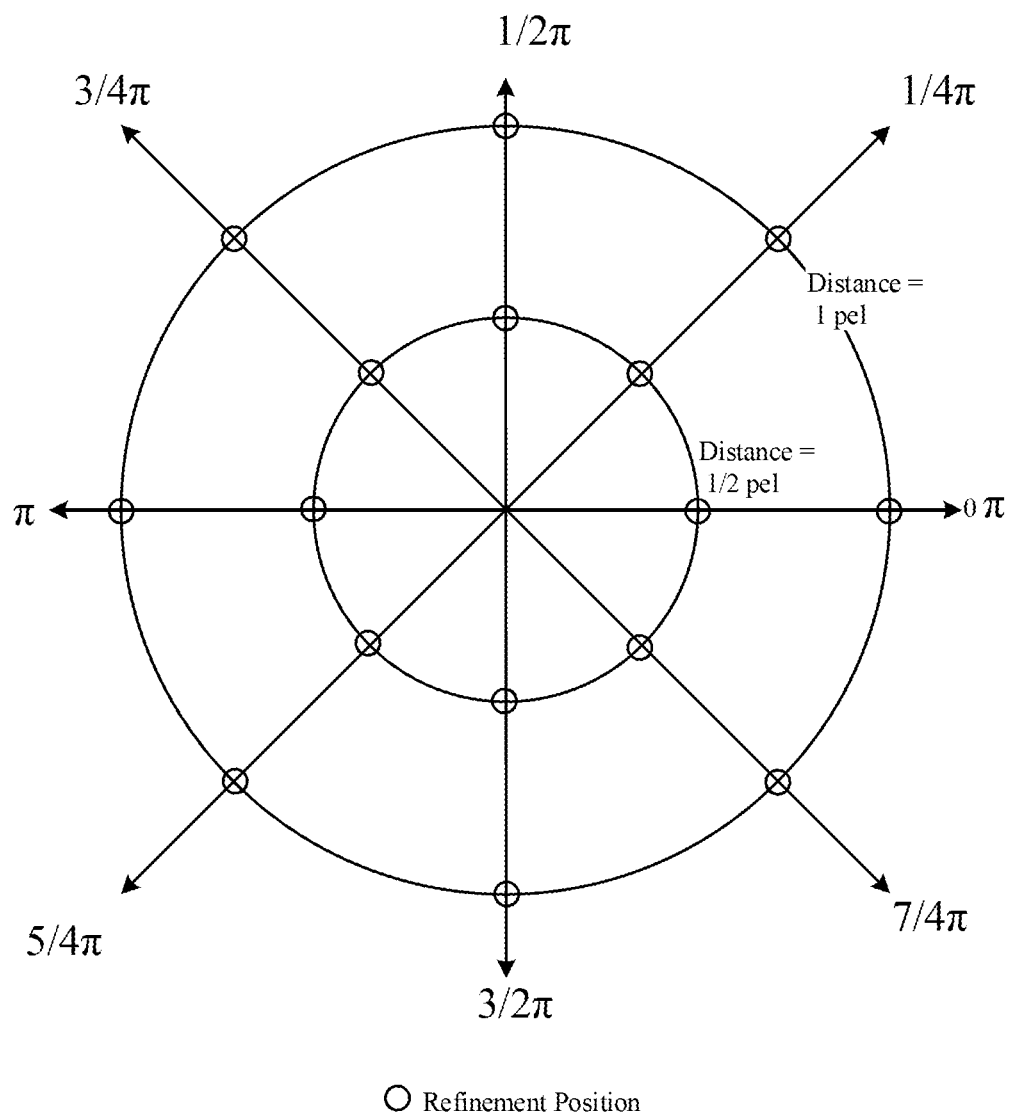
FIG. 8 conceptually illustrates an example subset of the refinement positions.

In some embodiments, the possible refinement positions identified in the first step is a subset of the full set of possible refinement positions. The encoder and decoder each identifies a list of N lowest cost refinement positions based on the subset. This subset can be any subset of the possible refinement positions that are agreed upon by the encoder and the decoder (e.g., through a video coding standard.) FIG. 8 conceptually illustrates an example subset of the refinement positions. In this example subset, refinement positions include only distances in the set {½-pel, 1-pel} and only directions in the set {n/4*π}, n ranges from 0 to 7. The encoder and decoder may each identify a list of N lowest cost refinement positions out of this subset and assign indices to those identified refinement positions according to a cost-based reordering. The video encoder may in turn signal the selection of a refinement position to the decoder by using the reordered indices.

Figure 9A:
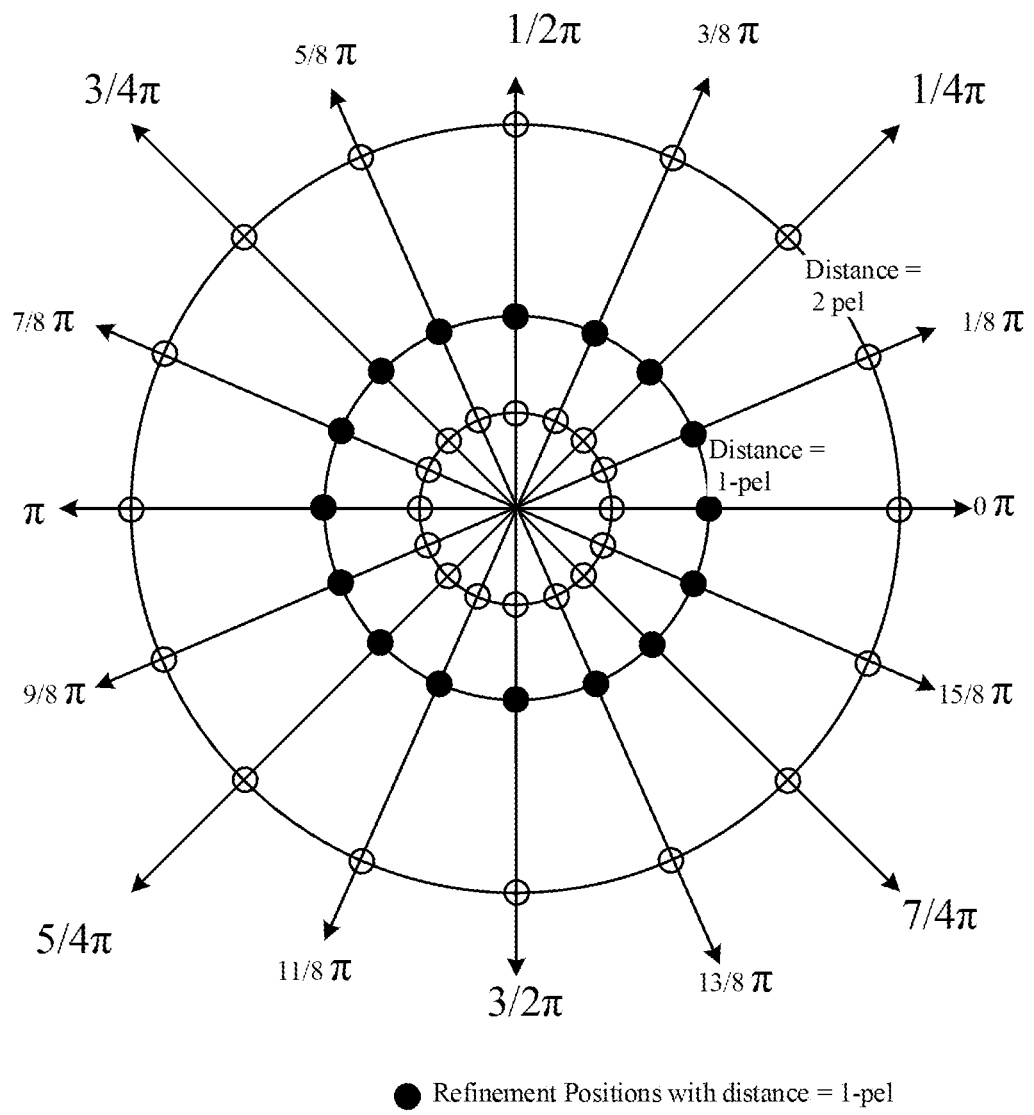
FIGS. 9A-C conceptually illustrate preselecting refinement positions based on a chosen distance.
Figure 9B:
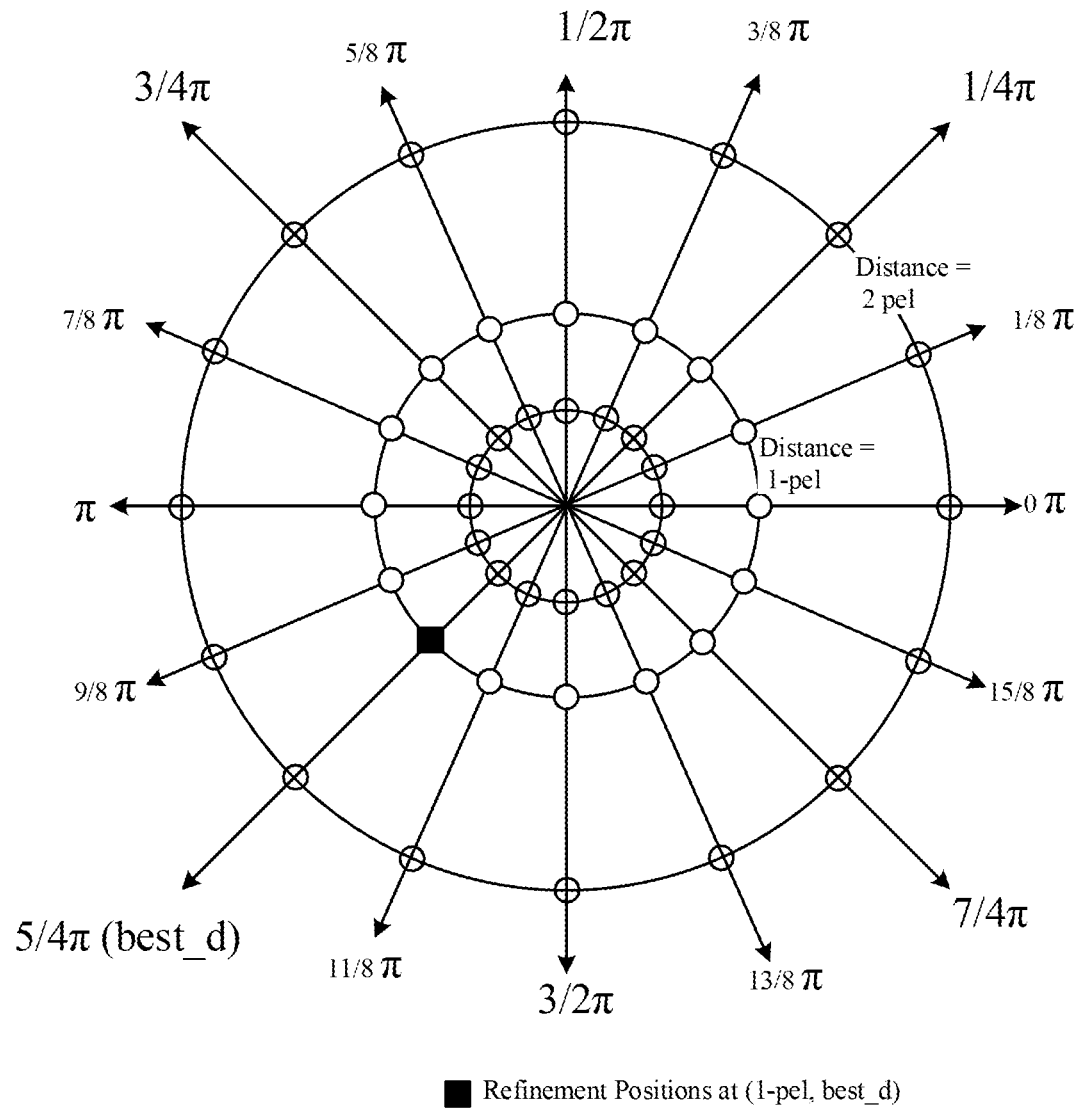
Figure 9C:
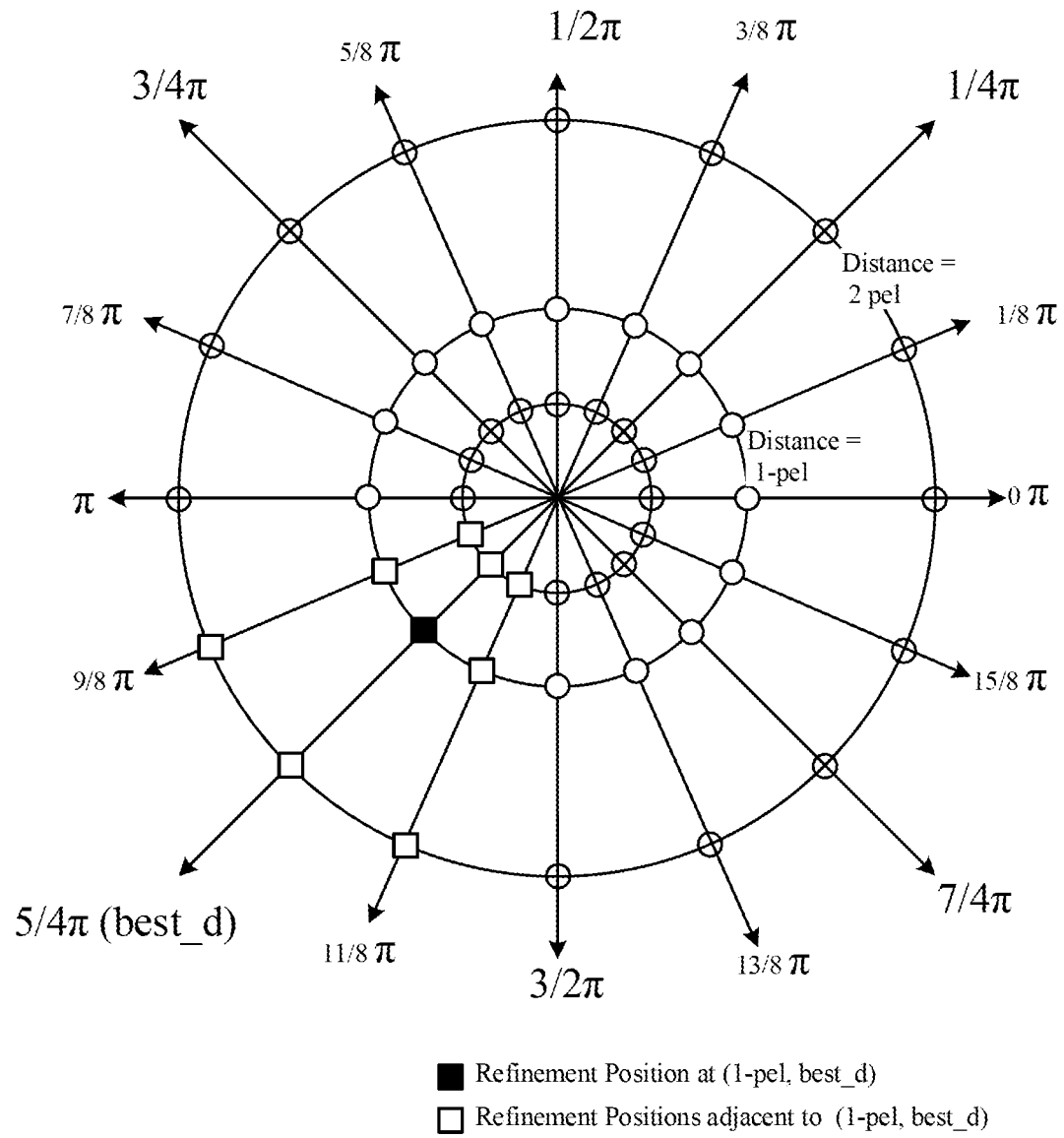

In some embodiments, the possible refinement positions identified in the first step include some promising refinement positions that are preselected by the video coder. The video encoder may then signal the selection of a MMVD refinement position by using indices assigned to the lowest cost refinement positions among the preselected refinement positions. FIGS. 9A-C conceptually illustrate preselecting refinement positions based on a chosen distance. In the example illustrated, the video coder chooses a distance from the set of possible distances, calculate the costs of refinement positions with the chosen distance but at different directions. The video coder identifies a direction (denoted as best_d) having the best cost at the chosen distance. Refinement positions neighboring or nearing or adjacent to best_d at the chosen distance are identified, reordered based on matching costs, and assigned indices based on the reordering. The video encoder may signal the selection of a refinement position for MMVD by using the reordered indices.

FIG. 9A conceptually illustrates choosing distance from the set of {¼-pel, ½-pel, 1-pel, 4-pel, 8-pel, 16-pel, 32-pel, 64-pel, 128-pel}. In the example, the selected distance is 1-pel. The video coder may then calculate costs for refinement positions with distance being 1-pel and directions being in the set of {0, ⅛*π, ¼*π, ⅜*π, ½*π, ⅝*π, ¾*π, ⅞*π, π, 9/8*π, 5/4*π, 11/8*π, 3/2*π, 13/8*π, 7/4*π, 15/8*π}, the costs of being the guess-costs computed by template matching or bilateral matching. The direction with the best cost maybe denoted as the best_d. FIG. 9B conceptually illustrates identifying the best cost direction (best_d) from refinement positions at the chosen distance (½-pel). The video coder then computes the costs at refinement positions near the best_d at the chosen distance (½-pel). FIG. 9C conceptually illustrates the refinement positions near the best_d at the chosen distance for whom costs are computed. In the figure, the eight refinement positions adjacent to (1-pel, best_d) are identified, reordered based on matching costs, and assigned indices based on the reordering. The refinement positions are denoted as (distance, direction), with distances in the set of {¼-pel, ½-pel, 1-pel, 4-pel, 8-pel, 16-pel, 32-pel, 64-pel, 128-pel} and with directions that can be any angle in the arithmetic progression set {best_d-n/8*π, best_d-n/8*π+d, best_d-n/8*π+2*d, best_d+n/8*π}, d=⅛*π, 0≤n≤7.

In some embodiments, the video coder preselects refinement positions based on a chosen distance. However, for finding the best_d at the chosen distance, the video coder examines only a subset of the possible directions rather than all of the possible directions ({n/8*π}, n ranges from 0 to 15). Once the best_d direction is identified at the chosen distance, refinement positions adjacent to (1-pel, best_d) are identified, reordered based on matching costs, and assigned indices based on the reordering. The refinement positions are denoted as (distance, direction), with distances in the set of {¼-pel, ½-pel, 1-pel, 4-pel, 8-pel, 16-pel, 32-pel, 64-pel, 128-pel} and with directions that can be any angle in the arithmetic progression set {best_d-n/m*π, best_d-n/m*π+d, best_d-n/m*π+2*d, best_d+n/m*π}, d=1/m*π.

In some embodiments, the video coder preselects refinement positions based on a distance that is given by the video encoder. The given distance is signaled as mmvd_distance_idx in the bitstream. (In other words, the distance index is not subject to cost-based reordering and that mmvd_distance_idx is not subject to bit-usage reduction.) The video coder examines the costs of refinement positions having the given distance and directions from the set {0, ⅛*π, ¼*π, ⅜*π, ½*π, ⅝*π, ¾*π, ⅞*π, π, 9/8*π, 5/4*π, 11/8*π, 3/2*π, 13/8*π, 7/4*π, 15/8*π}. In some embodiments, the video coder examines the costs of refinement positions having the given distance and directions from a subset of the set {0, ⅛*π, ¼*π, ⅜*π, ½*π, ⅝*π, ¾*π, ⅞*π, 1*π, 9/8*π, 5/4*π, 11/8*π, 3/2*π, 13/8*π, 7/4*π, 15/8*π}. The examined refinement positions are reordered based on matching costs, and assigned indices based on the reordering.

Figure 10:
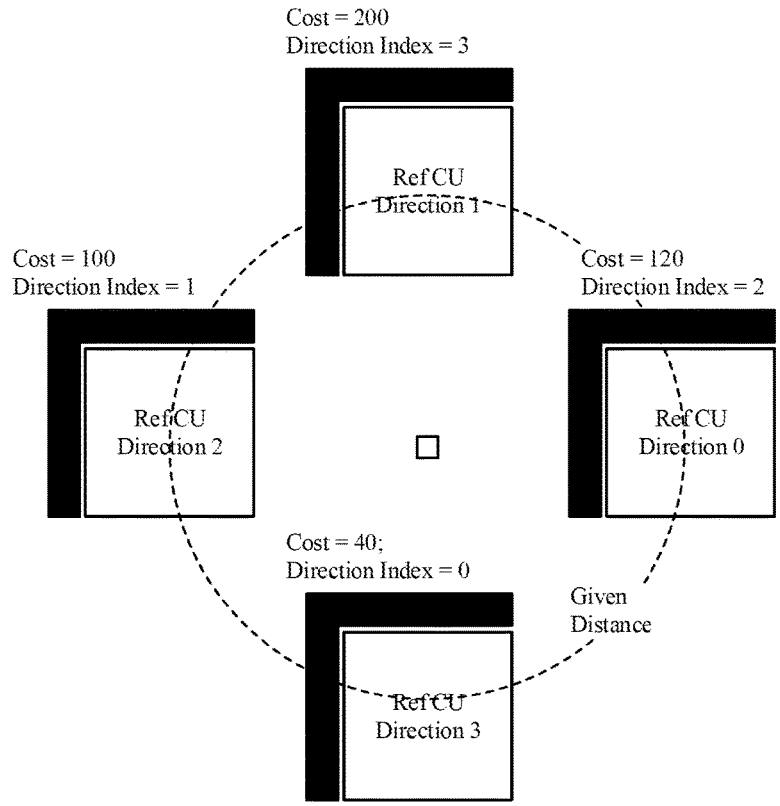
FIG. 10 conceptually illustrates reordering among refinement positions having the same distance but different directions.
Figure 11:
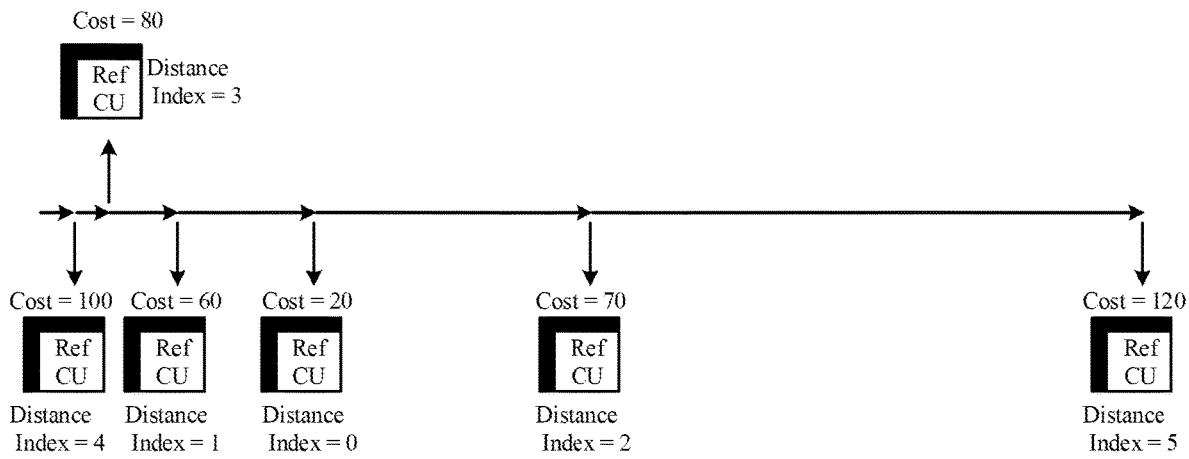
FIG. 11 conceptually illustrates reordering among refinement positions having the same direction but different distances.

In some embodiments, the distance index mmvd_distance_idx is given (by the encoder), and the video coder performs reordering for coding the direction index mmvd_direction_idx. Conversely, in some embodiments, the direction index mmvd_direction_idx is given (by encoder), and the video coder performs reordering for coding the distance index mmvd_distance_idx. FIG. 10 conceptually illustrates reordering among refinement positions having the same distance but different directions. In this case, the mmvd_direction_idx is based on reordered indices. FIG. 11 conceptually illustrates reordering among refinement positions having the same direction but different distances. In this case, the mmvd_distance_idx is based on reordered indices.

In some embodiments, refinement positions are divided into groups, such that each refinement position can be denoted as {(group, direction, distance)}. The video encoder may signal the selection of a refinement position by signaling a group index, a distance index, and a direction index. In some embodiments, the video coder performs reordering of candidates within a selected group so that the distance index (mmvd_distance_idx) and/or the direction index (mmvd_direction_idx) are signaled by using reordered indices. For some embodiments, the member refinement positions of the selected group are the possible candidate prediction positions identified in step (1) of candidate reordering.

Figure 12:
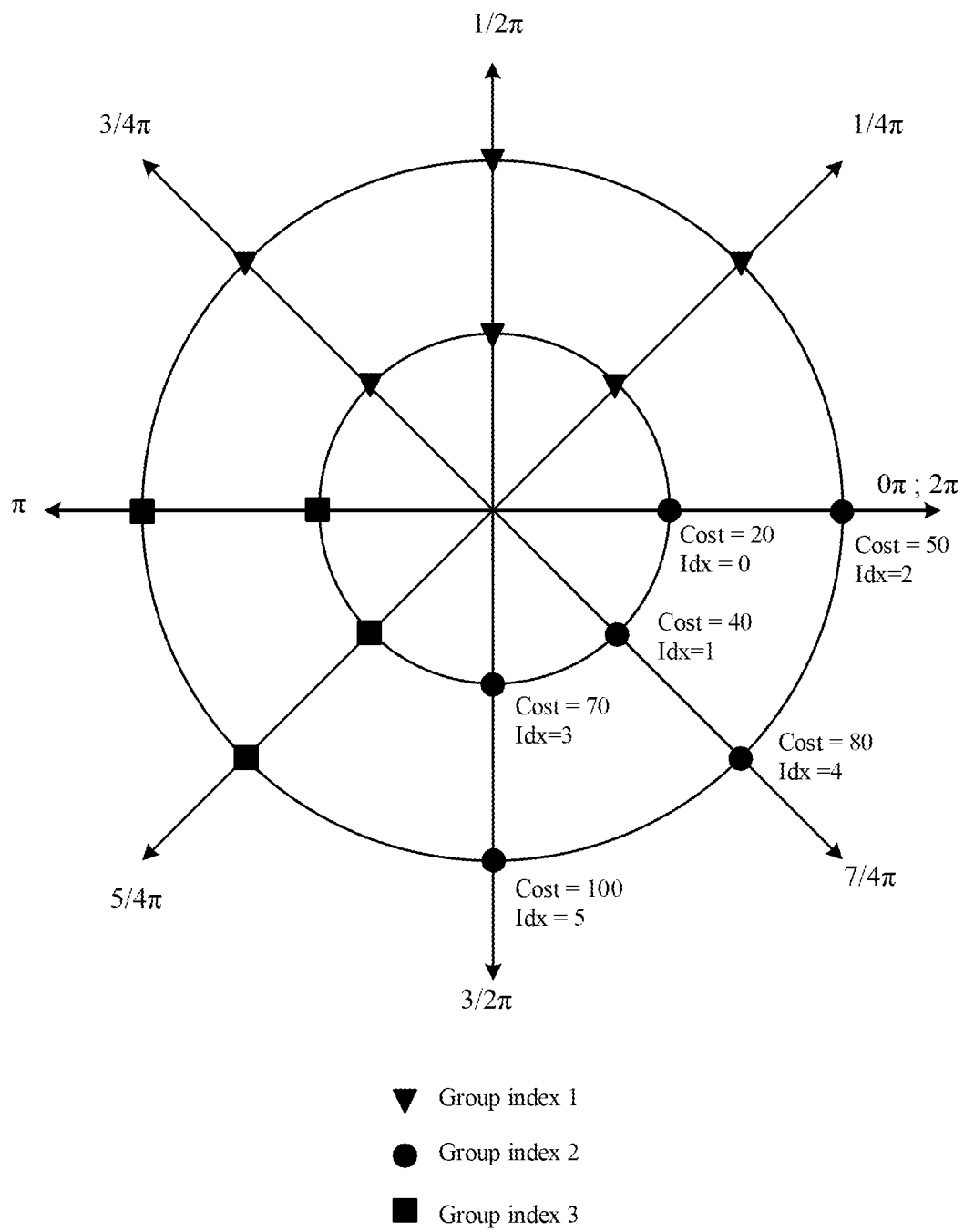
FIG. 12 conceptually illustrates refinement positions that are divided into groups.

FIG. 12 conceptually illustrates refinement positions that are divided into groups. Let A be a subset of {¼-pel, ½-pel, 1-pel, 2-pel, 4-pel, 8-pel, 16-pel, 32-pel, 64-pel, 128-pel}, let B be a subset of {0, ⅛*π, ⅖*π, ⅜*π, ⅘*π, ⅝*π, ⅚*π, ⅞*π, 8/8*π, 9/8*π, 10/8*π, 11/8*π, 12/8*π, 13/8*π, 14/8*π, 15/8*π}. B is divided into several groups. Each group contains refinement positions having adjacent or neighboring directions, though the sizes of the different groups may not be equal.

In the example, A is the set {1-pel, 2-pel} and B is the set {0, ¼*π, ½*π, ¾*π, 1*π, 5/4*π, 3/2*π, 7/4*π}. Based on sets A and B, there are 16 possible positions. Among these, 6 refinement positions are in group 1 (directions from ¼*π to ¾*π), 6 refinement positions are in group 2 (directions from 3/2π to 2π), and 4 refinement positions are in group 3 (directions from π to 5/4π). When group 2 is selected (by receiving or signaling the corresponding index), the 6 refinement positions of the group 2 can be signaled using reordered indices that are assigned to members of group 2. The video coders (encoder and decoder) assign the reordered indices to member refinement positions of the group based on matching costs. The reordered index of the selected member refinement position may be signaled using mmvd_distance_idx and/or mmvd_direction_idx.

In some embodiments, the video coder (encoder or decoder) performs reordering among different groups of refinement positions so that the group index is signaled by using reordered indices, while the member refinement positions within the group are signaled using mmvd_distance_idx and/or mmvd_direction_idx but without reordering. In some of these embodiments, the set of possible directions (B) is divided into groups. Each group contains refinement positions having adjacent directions. All groups have equal number of member refinement positions. The video coder computes a cost for each group (by e.g., computing the matching cost of a representative member refinement position) and assigns indices to the different groups according to the computed costs.

Figure 13:
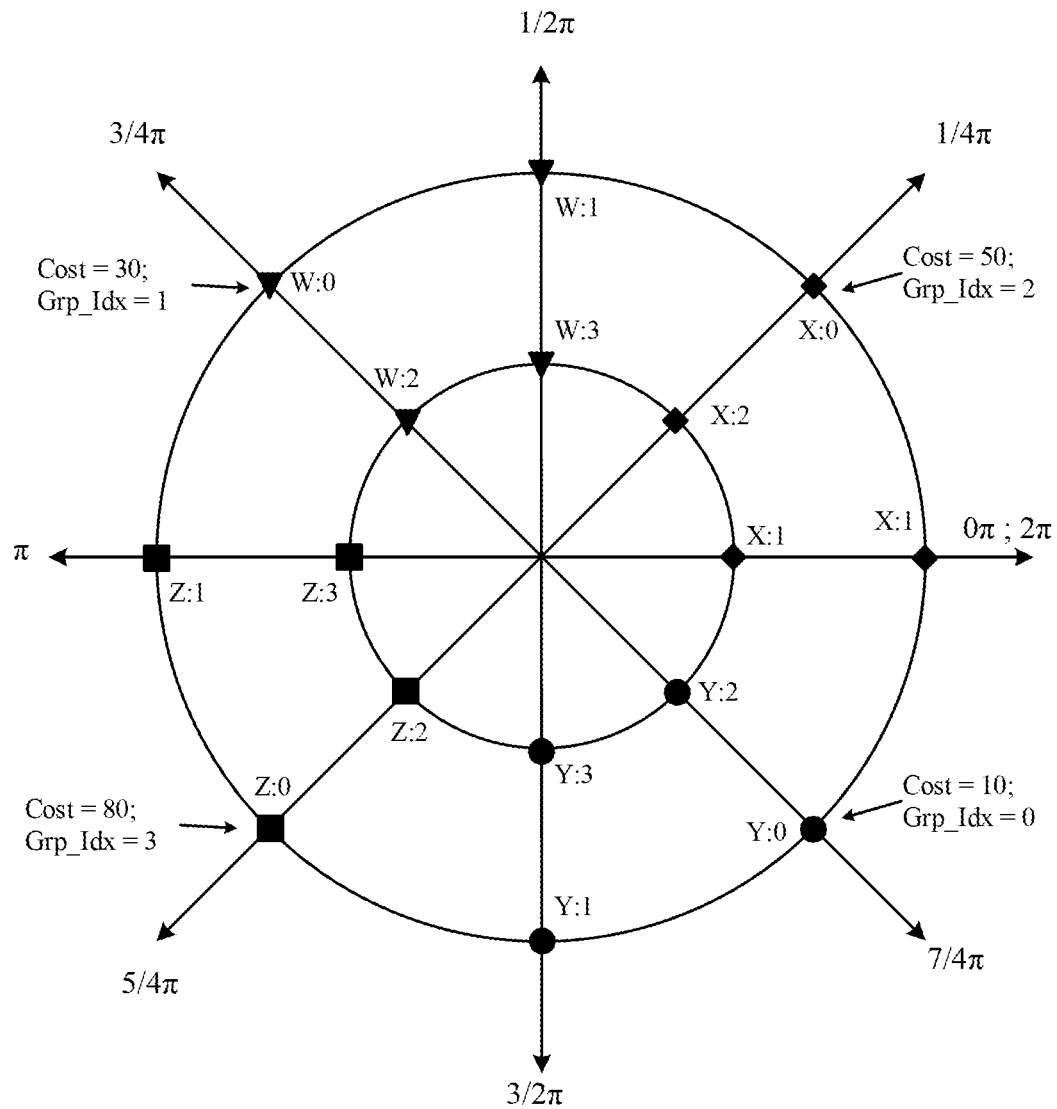
FIG. 13 conceptually illustrates reordering among different groups of refinement positions.

FIG. 13 conceptually illustrates reordering among different groups of refinement positions. As illustrated, 16 possible refinement positions are divided into four groups W, X, Y, and Z, each group having four member refinement positions with adjacent directions. The members of each group are indexed based on their relative positions to a designated representative refinement position in the group. For example, the refinement position labeled (W: 0) is the designated representative refinement position for group W, the refinement position labeled (X: 0) is the designated representative refinement position for group X, etc.

The video coder computes a cost for each group by computing the matching cost at the representative refinement position of the group. In the example, the matching cost of the refinement position "W: 0" is 30, so 30 is used as the cost for the group W. The matching cost of the refinement position "X: 0" is 50, so 50 is used as the cost of the group X, and so on. In other words, the representative refinement positions (W: 0, X: 0, Y: 0, Z: 0) can be considered the possible candidate prediction positions identified in step (1) of candidate reordering.

Based on the computed costs of the different groups, each group is assigned a reordered index: group W is assigned reordered group index 1, group X is assigned reordered group index 2, group Y is assigned reordered group index 0, group Z is assigned reordered group index 3. Thus, for example, if the refinement position labeled "Y: 2" is selected, the encoder would signal '0' for group index (the reordered index for group Y) and '2' for corresponding mmvd_distance_idx and/or mmvd_direction_idx.

As mentioned, in order to reduce the number of bits being signaled, the video coder chooses the top N refinement positions with the lowest costs as the available refinement positions, N being less than or equal to the number of the possible refinement positions. In this case, the video coder chooses top M groups with the lowest cost as available groups, with M being less than or equal to the number of all possible groups. This allows the video coder to use less bits to signal a group index than what is needed to signal all possible groups.

III. Example Video Encoder

Figure 14:
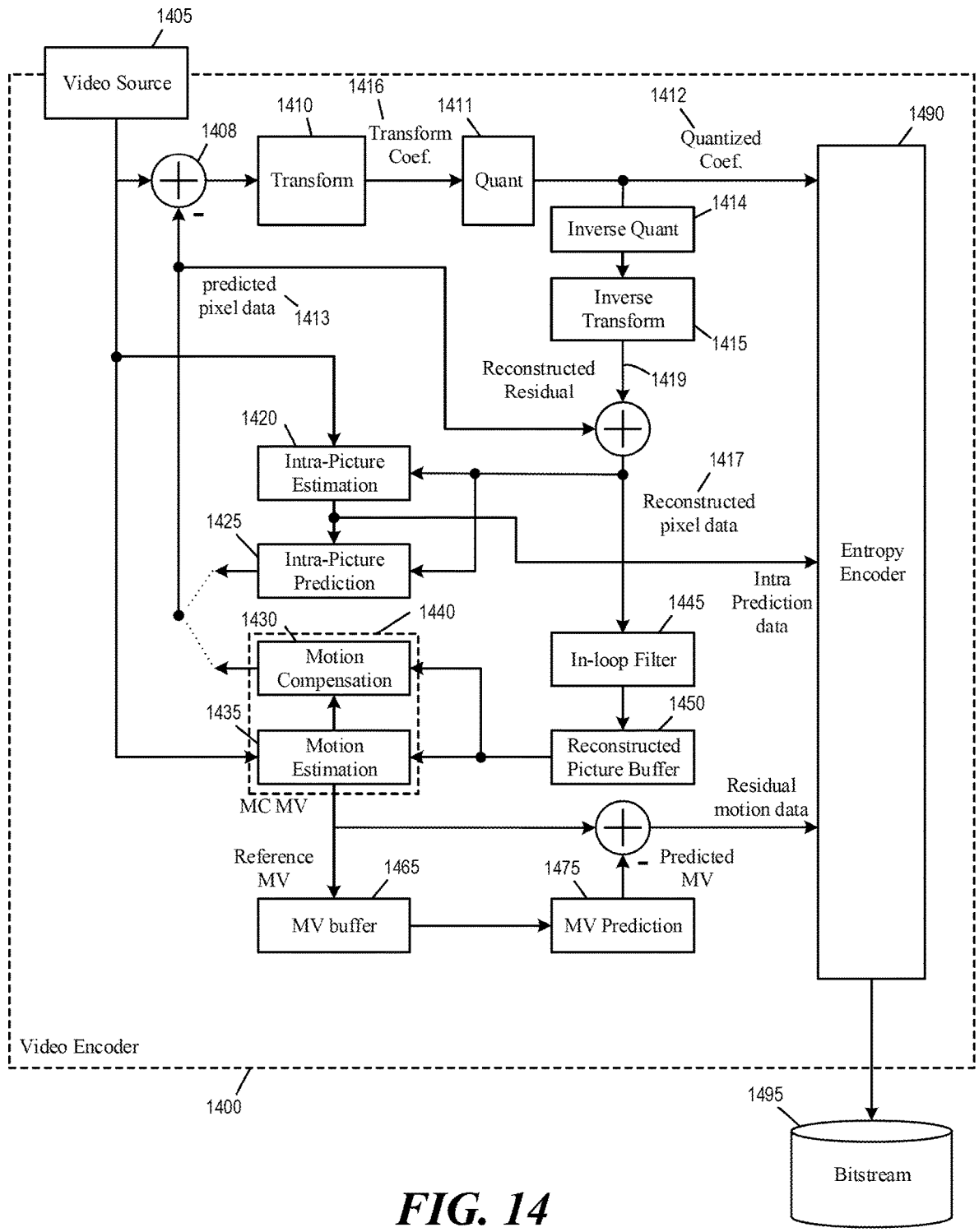
FIG. 14 illustrates an example video encoder that may support reordering of prediction candidates.

FIG. 14 illustrates an example video encoder 1400 that may support reordering of prediction candidates. As illustrated, the video encoder 1400 receives input video signal from a video source 1405 and encodes the signal into bitstream 1495. The video encoder 1400 has several components or modules for encoding the signal from the video source 1405, at least including some components selected from a transform module 1410, a quantization module 1411, an inverse quantization module 1414, an inverse transform module 1415, an intra-picture estimation module 1420, an intra-prediction module 1425, a motion compensation module 1430, a motion estimation module 1435, an in-loop filter 1445, a reconstructed picture buffer 1450, a MV buffer 1465, and a MV prediction module 1475, and an entropy encoder 1490. The motion compensation module 1430 and the motion estimation module 1435 are part of an inter-prediction module 1440.

In some embodiments, the modules 1410-1490 are modules of software instructions being executed by one or more processing units (e.g., a processor) of a computing device or electronic apparatus. In some embodiments, the modules 1410-1490 are modules of hardware circuits implemented by one or more integrated circuits (ICs) of an electronic apparatus. Though the modules 1410-1490 are illustrated as being separate modules, some of the modules can be combined into a single module.

The video source 1405 provides a raw video signal that presents pixel data of each video frame without compression. A subtractor 1408 computes the difference between the raw video pixel data of the video source 1405 and the predicted pixel data 1413 from the motion compensation module 1430 or intra-prediction module 1425. The transform module 1410 converts the difference (or the residual pixel data or residual signal 1408) into transform coefficients (e.g., by performing Discrete Cosine Transform, or DCT).

The quantization module 1411 quantizes the transform coefficients into quantized data (or quantized coefficients) 1412, which is encoded into the bitstream 1495 by the entropy encoder 1490.

The inverse quantization module 1414 de-quantizes the quantized data (or quantized coefficients) 1412 to obtain transform coefficients, and the inverse transform module 1415 performs inverse transform on the transform coefficients to produce reconstructed residual 1419. The reconstructed residual 1419 is added with the predicted pixel data 1413 to produce reconstructed pixel data 1417. In some embodiments, the reconstructed pixel data 1417 is temporarily stored in a line buffer (not illustrated) for intra-picture prediction and spatial MV prediction. The reconstructed pixels are filtered by the in-loop filter 1445 and stored in the reconstructed picture buffer 1450. In some embodiments, the reconstructed picture buffer 1450 is a storage external to the video encoder 1400. In some embodiments, the reconstructed picture buffer 1450 is a storage internal to the video encoder 1400.

The intra-picture estimation module 1420 performs intra-prediction based on the reconstructed pixel data 1417 to produce intra prediction data. The intra-prediction data is provided to the entropy encoder 1490 to be encoded into bitstream 1495. The intra-prediction data is also used by the intra-prediction module 1425 to produce the predicted pixel data 1413.

The motion estimation module 1435 performs inter-prediction by producing MVs to reference pixel data of previously decoded frames stored in the reconstructed picture buffer 1450. These MVs are provided to the motion compensation module 1430 to produce predicted pixel data.

Instead of encoding the complete actual MVs in the bitstream, the video encoder 1400 uses MV prediction to generate predicted MVs, and the difference between the MVs used for motion compensation and the predicted MVs is encoded as residual motion data and stored in the bitstream 1495.

The MV prediction module 1475 generates the predicted MVs based on reference MVs that were generated for encoding previously video frames, i.e., the motion compensation MVs that were used to perform motion compensation. The MV prediction module 1475 retrieves reference MVs from previous video frames from the MV buffer 1465. The video encoder 1400 stores the MVs generated for the current video frame in the MV buffer 1465 as reference MVs for generating predicted MVs.

The MV prediction module 1475 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1495 by the entropy encoder 1490.

The entropy encoder 1490 encodes various parameters and data into the bitstream 1495 by using entropy-coding techniques such as context-adaptive binary arithmetic coding (CABAC) or Huffman encoding. The entropy encoder 1490 encodes various header elements, flags, along with the quantized transform coefficients 1412, and the residual motion data as syntax elements into the bitstream 1495. The bitstream 1495 is in turn stored in a storage device or transmitted to a decoder over a communications medium such as a network.

The in-loop filter 1445 performs filtering or smoothing operations on the reconstructed pixel data 1417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 15:
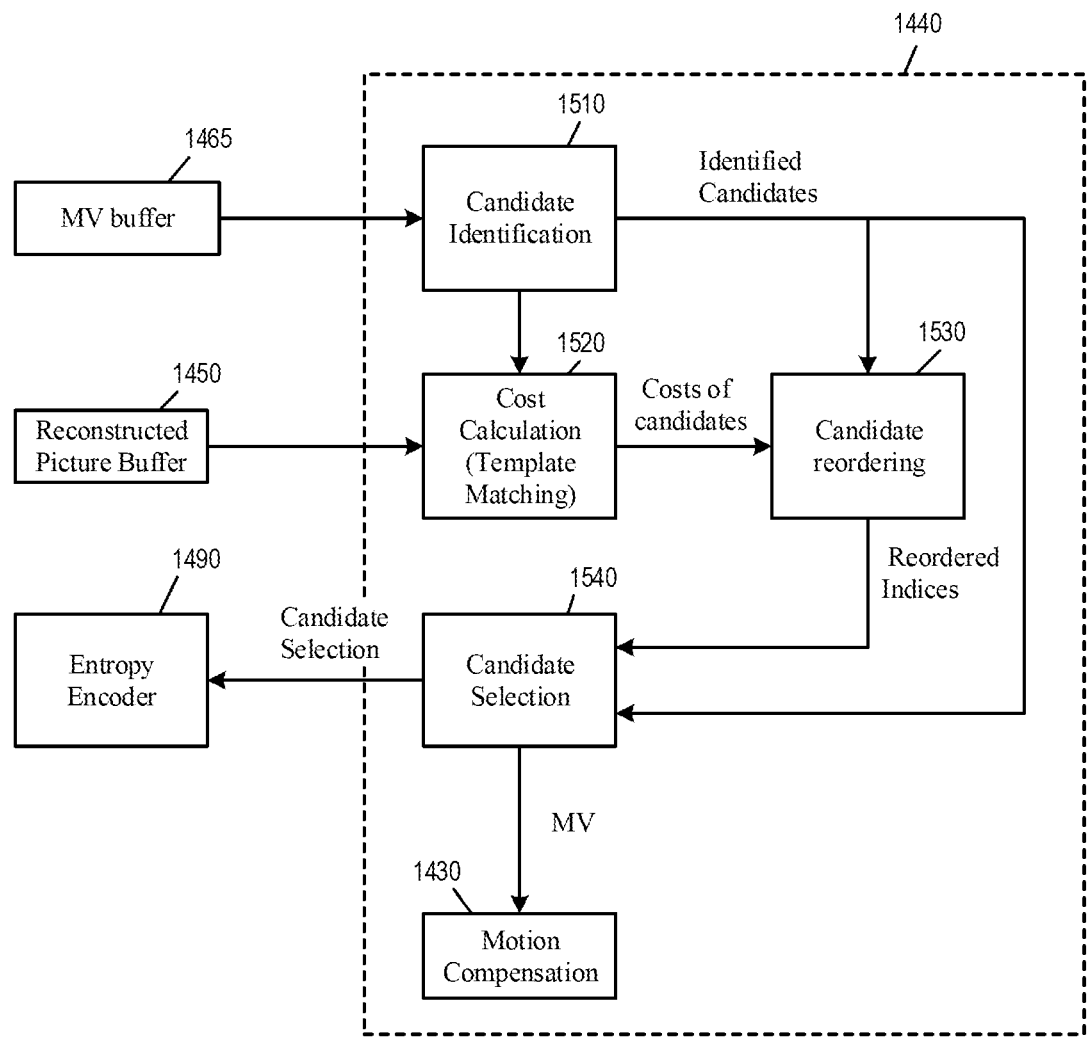
FIG. 15 illustrates portions of the video encoder that implement candidate reordering.

FIG. 15 illustrates portions of the video encoder 1400 that implement candidate reordering. Specifically, the figure illustrates the components of the inter-prediction module 1440 of the video encoder 1400. As illustrated, the inter-prediction module 1440 retrieves candidate motion vectors from the MV buffer 1465 and searches the content of the reconstructed picture buffer 1450 to generate a MV for the current block.

The inter-prediction module 1440 includes the motion compensation module 1430, a candidate identification module 1510, a cost calculation module 1520, a candidate reordering module 1530, and a candidate selection module 1540. In some embodiments, the modules 1510-1540 are part of the motion estimation module 1435.

The candidate identification module 1510 identifies candidate prediction positions by identifying e.g., merge candidates or MMVD refinement positions based on the content of the MV buffer 1465. The identified candidate prediction positions or refinement positions may have different directions and distances from a merge candidate. The identified candidate prediction positions may be a predefined group of refinement positions (FIG. 12), representative refinement positions of different groups of refinement positions (FIG. 13), a predefined set or subset of refinement positions (FIGS. 7 and 8), refinement positions at a particular distance (FIG. 10) or a particular direction (FIG. 11), a collection of neighboring refinement positions of a particular refinement position having preferred direction and/or distance (FIG. 9A-C).

The cost calculation module 1520 calculates the cost (guess-cost or matching cost) of the various candidate prediction positions by bilateral matching or template matching as described by reference to FIGS. 4-5 above and by retrieving pixel data from the reconstructed picture buffer 1450. The computed costs of the various candidate positions are provided to the candidate reordering module 1530, which assigns reordered indices to the various candidate positions, particularly a number (N) of lowest costs candidates.

The candidate selection module 1540 may select one of the identified candidates to formulate a MV for the motion compensation module 1430 to generate the predicted pixel data 1413. The candidate selection module 1540 also provide the reordered index of the selected candidate to the entropy encoder 1490 so that the entropy encoder may use fewer bits to signal the selection in the bitstream 1495. The reordered index may be used to indicate the group, the distance, and/or the direction of the selected candidate.

Figure 16:
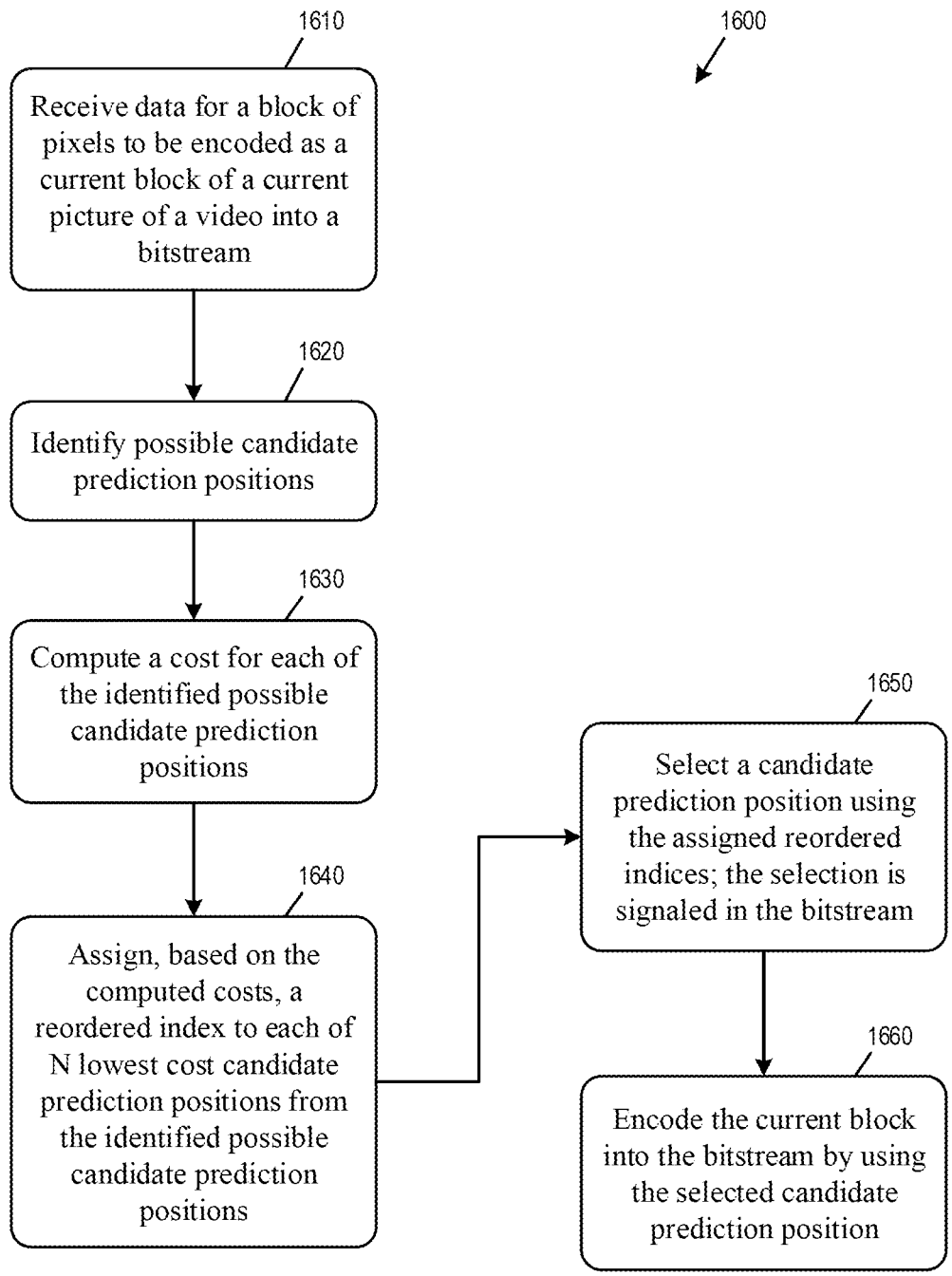
FIG. 16 conceptually illustrates a process for using reordering of prediction candidates to encode pixel blocks.

FIG. 16 conceptually illustrates a process 1600 for using reordering of prediction candidates to encode pixel blocks. In some embodiments, one or more processing units (e.g., a processor) of a computing device implements the encoder 1400 performs the process 1600 by executing instructions stored in a computer readable medium. In some embodiments, an electronic apparatus implementing the encoder 1400 performs the process 1600.

The encoder receives (at block 1610) data for a block of pixels to be encoded as a current block of a current picture of a video into a bitstream;

The encoder identifies (at block 1620) possible candidate prediction positions. In some embodiments, each candidate prediction position is a refinement position that refines a merge candidate or starting MV by specifying a direction and a distance relative to the merge candidate.

In some embodiments, the encoder identifies the possible candidate prediction positions by finding a particular refinement position having a lowest cost among refinement positions at a particular distance or direction from the merge candidate (e.g., by finding the best_d direction) and by identifying a set of refinement positions that neighbor the particular refinement position as the possible candidate prediction positions. The particular distance or direction may be provided by a video encoder in the bitstream.

The encoder computes (at block 1630) a cost for each of the identified possible candidate prediction positions. The cost of a candidate prediction position may be computed by matching a template of the current block and a template of a reference block that is referenced by the candidate prediction position. The template of a pixel block includes pixels to the top and to the left of the pixel block.

The encoder assigns (at block 1640), based on the computed costs, a reordered index to each of N lowest cost candidate prediction positions from the identified possible candidate prediction positions. In some embodiments, N is a number greater than one but less than a total number of the identified possible candidate prediction positions such that only a subset of the possible candidate prediction positions identified, thereby reducing the number of bits needed for coding or signaling.

The encoder selects (at block 1650) a candidate prediction position using the assigned reordered indices, wherein the selection is signaled in the bitstream. In some embodiments in which the candidate prediction positions are refinement positions of MMVD, the selection signaled in the bitstream may specify a reordered index for the distance or a reordered index for the direction.

The encoder encodes (at block 1660) the current block into the bitstream by using the selected candidate prediction position. Specifically, the selected candidate prediction position or refinement position is used to derive the MV for obtaining the prediction data.

In some embodiments, the selection being signaled includes (i) a group index specifying a selected group of a plurality of groups of candidate refinement positions and (ii) one or more indices (e.g., a direction index and/or a distance index) specifying a selected candidate refinement position within the selected group. FIG. 12 above illustrates an example in which all of the identified possible candidate prediction positions belong to the selected group of candidate refinement positions. The reordered indices are assigned to N lowest cost candidate refinement positions of the selected group, and the one or more indices specifying the selected candidate refinement position within the selected group include a reordered index. The different groups of candidate refinement positions may have different numbers of member candidate refinement positions. FIG. 13 above illustrates an example in which each identified possible candidate prediction position is a representative candidate refinement position of a different group of candidate refinement positions. The reordered indices are assigned to N groups respectively having N lowest cost representative candidate refinement positions, N being less than or equal to a total number of groups in the plurality of groups of candidate refinement positions. The group index specifying the selected group of candidate refinement positions is a reordered index. Each group in the multiple groups of candidate refinement positions has a same numbers of member candidate refinement positions.

IV. Example Video Decoder

In some embodiments, an encoder may signal (or generate) one or more syntax element in a bitstream, such that a decoder may parse said one or more syntax element from the bitstream.

Figure 17:
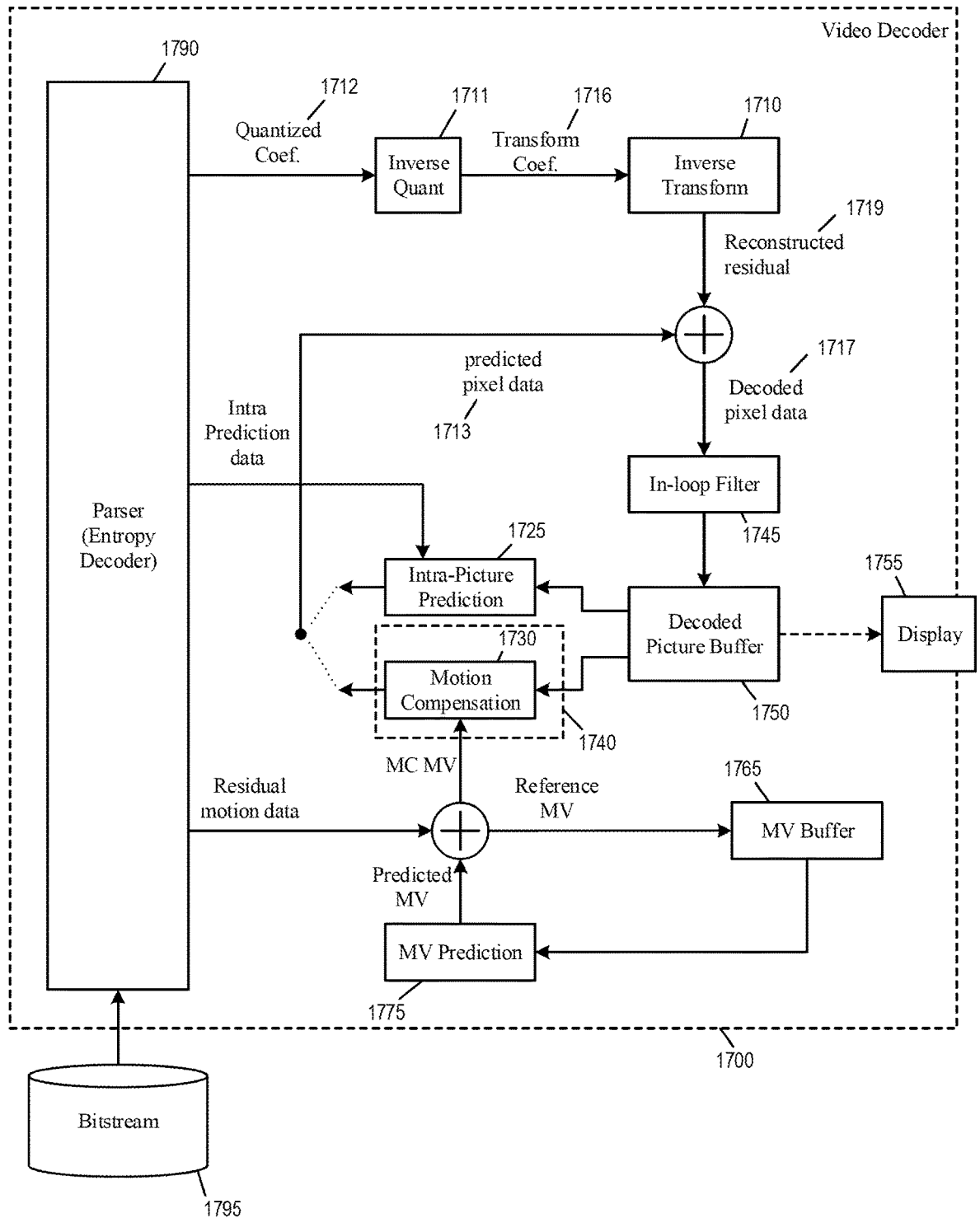
FIG. 17 illustrates an example video decoder that may support reordering of prediction candidates.

FIG. 17 illustrates an example video decoder 1700 that may support reordering of prediction candidates. As illustrated, the video decoder 1700 is an image-decoding or video-decoding circuit that receives a bitstream 1795 and decodes the content of the bitstream into pixel data of video frames for display. The video decoder 1700 has several components or modules for decoding the bitstream 1795, including some components selected from an inverse quantization module 1711, an inverse transform module 1710, an intra-prediction module 1725, a motion compensation module 1730, an in-loop filter 1745, a decoded picture buffer 1750, a MV buffer 1765, a MV prediction module 1775, and a parser 1790. The motion compensation module 1730 is part of an inter-prediction module 1740.

In some embodiments, the modules 1710-1790 are modules of software instructions being executed by one or more processing units (e.g., a processor) of a computing device. In some embodiments, the modules 1710-1790 are modules of hardware circuits implemented by one or more ICs of an electronic apparatus. Though the modules 1710-1790 are illustrated as being separate modules, some of the modules can be combined into a single module.

The parser 1790 (or entropy decoder) receives the bitstream 1795 and performs initial parsing according to the syntax defined by a video-coding or image-coding standard. The parsed syntax element includes various header elements, flags, as well as quantized data (or quantized coefficients) 1712. The parser 1790 parses out the various syntax elements by using entropy-coding techniques such as context-adaptive binary arithmetic coding (CABAC) or Huffman encoding.

The inverse quantization module 1711 de-quantizes the quantized data (or quantized coefficients) 1712 to obtain transform coefficients, and the inverse transform module 1710 performs inverse transform on the transform coefficients 1716 to produce reconstructed residual signal 1719. The reconstructed residual signal 1719 is added with predicted pixel data 1713 from the intra-prediction module 1725 or the motion compensation module 1730 to produce decoded pixel data 1717. The decoded pixels data are filtered by the in-loop filter 1745 and stored in the decoded picture buffer 1750. In some embodiments, the decoded picture buffer 1750 is a storage external to the video decoder 1700. In some embodiments, the decoded picture buffer 1750 is a storage internal to the video decoder 1700.

The intra-prediction module 1725 receives intra-prediction data from bitstream 1795 and according to which, produces the predicted pixel data 1713 from the decoded pixel data 1717 stored in the decoded picture buffer 1750. In some embodiments, the decoded pixel data 1717 is also stored in a line buffer (not illustrated) for intra-picture prediction and spatial MV prediction.

In some embodiments, the content of the decoded picture buffer 1750 is used for display. A display device 1755 either retrieves the content of the decoded picture buffer 1750 for display directly, or retrieves the content of the decoded picture buffer to a display buffer. In some embodiments, the display device receives pixel values from the decoded picture buffer 1750 through a pixel transport.

The motion compensation module 1730 produces predicted pixel data 1713 from the decoded pixel data 1717 stored in the decoded picture buffer 1750 according to motion compensation MVs (MC MVs). These motion compensation MVs are decoded by adding the residual motion data received from the bitstream 1795 with predicted MVs received from the MV prediction module 1775.

The MV prediction module 1775 generates the predicted MVs based on reference MVs that were generated for decoding previous video frames, e.g., the motion compensation MVs that were used to perform motion compensation. The MV prediction module 1775 retrieves the reference MVs of previous video frames from the MV buffer 1765. The video decoder 1700 stores the motion compensation MVs generated for decoding the current video frame in the MV buffer 1765 as reference MVs for producing predicted MVs.

The in-loop filter 1745 performs filtering or smoothing operations on the decoded pixel data 1717 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 18:
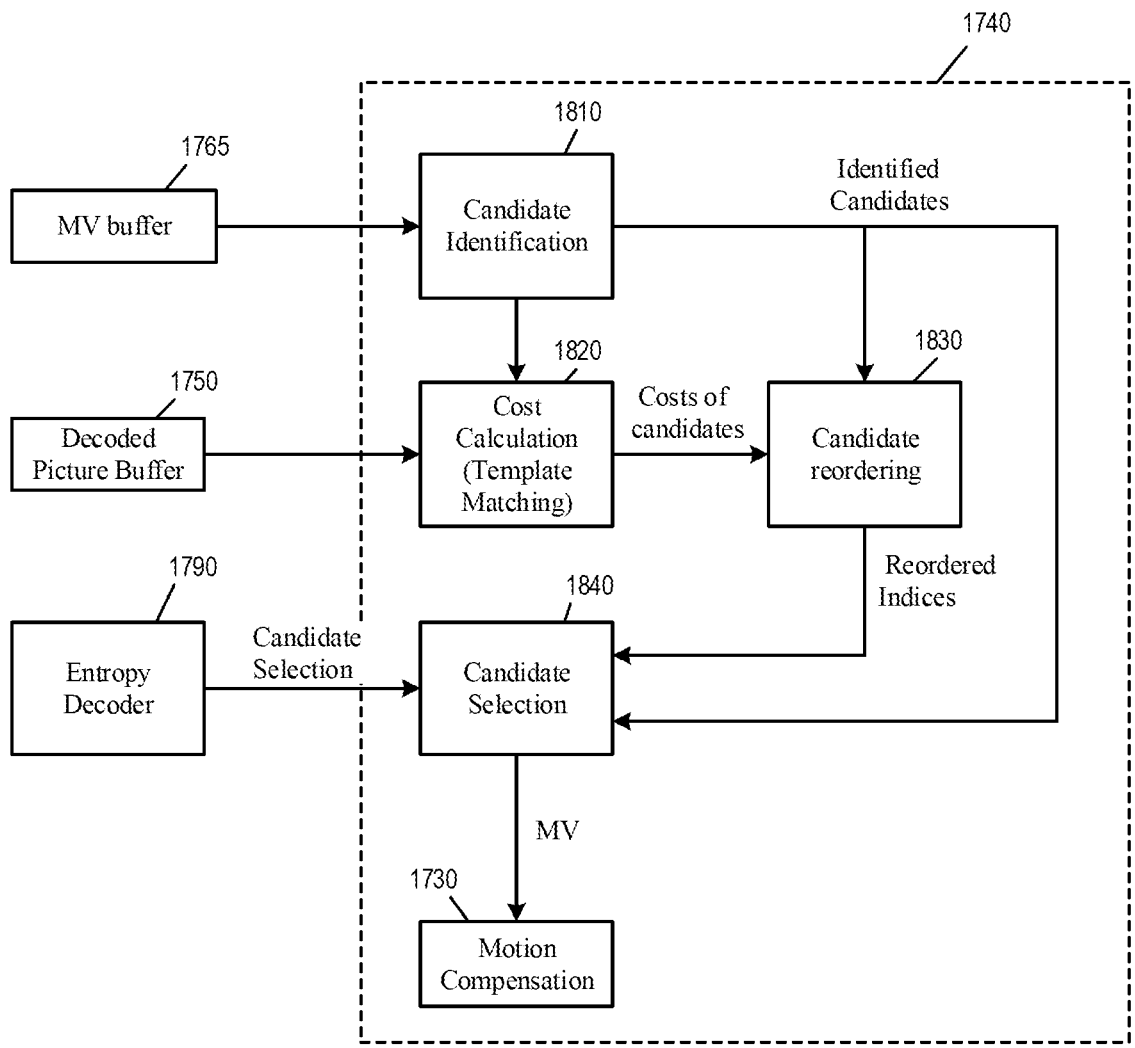
FIG. 18 illustrates portions of the video decoder that implement candidate reordering.

FIG. 18 illustrates portions of the video decoder 1700 that implement candidate reordering. Specifically, the figure illustrates the components of the inter-prediction module 1740 of the video decoder 1700. As illustrated, the inter-prediction module 1740 retrieves candidate motion vectors from the MV buffer 1765 and searches the content of the decoded picture buffer 1750 to generate a MV for the current block.

The inter-prediction module 1740 includes the motion compensation module 1730, a candidate identification module 1810, a cost calculation module 1820, a candidate reordering module 1830, and a candidate selection module 1840.

The candidate identification module 1810 identifies candidate prediction positions by identifying e.g., merge candidates or MMVD refinement positions based on the content of the MV buffer 1765. The identified candidate prediction positions or refinement positions may have different directions and distances from a merge candidate. The identified candidate prediction positions may be a predefined group of refinement positions (FIG. 12), representative refinement positions of different groups of refinement positions (FIG. 13), a predefined set or subset of refinement positions (FIGS. 7 and 8), refinement positions at a particular distance (FIG. 10) or a particular direction (FIG. 11), a collection of neighboring refinement positions of a particular refinement position having preferred direction and/or distance (FIG. 9A-C).

The cost calculation module 1820 calculates the cost or guess-cost of the various candidate prediction positions by bilateral matching or template matching as described by reference to FIGS. 4-5 above and by retrieving pixel data from the decoded picture buffer 1750. The computed costs of the various candidate positions are provided to the candidate reordering module 1830, which assigns reordered indices to the various candidate positions, particularly a number (N) of lowest costs candidates.

The candidate selection module 1840 receives a selection of a candidate from the entropy decoder 1790, which may parse the selection from the bitstream 1795. The selection of the candidate may include a reordered index that is used to indicate the group, the distance, and/or the direction of the selected candidate. The candidate selection module 1840 uses the candidate selection signaled by the entropy decoder 1790 to select one of the candidates identified by the candidate identification module 1810. The selected candidate is then used to formulate a MV for the motion compensation module 1730 to generate the predicted pixel data 1713.

Figure 19:
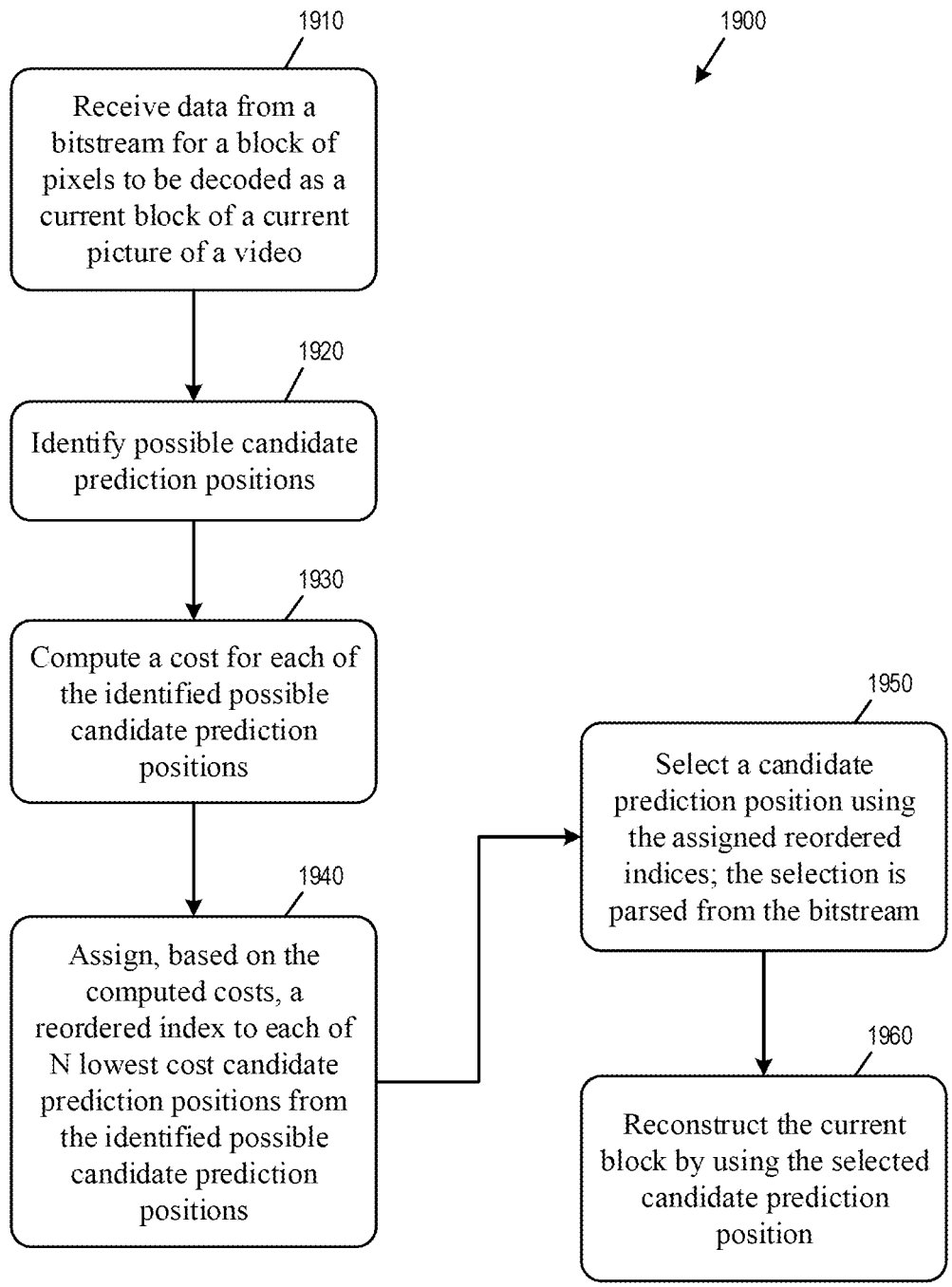
FIG. 19 conceptually illustrates a process for using reordering of prediction candidates to decode pixel blocks.

FIG. 19 conceptually illustrates a process 1900 for using reordering of prediction candidates to decode pixel blocks. In some embodiments, one or more processing units (e.g., a processor) of a computing device implements the decoder 1700 performs the process 1900 by executing instructions stored in a computer readable medium. In some embodiments, an electronic apparatus implementing the decoder 1400 performs the process 1900.

The decoder receives (at block 1910) data from a bitstream for a block of pixels to be decoded as a current block of a current picture of a video.

The decoder identifies (at block 1920) possible candidate prediction positions. In some embodiments, each candidate prediction position is a refinement position that refines a merge candidate or starting MV by specifying a direction and a distance relative to the merge candidate.

In some embodiments, the decoder identifies the possible candidate prediction positions by finding a particular refinement position having a lowest cost among refinement positions at a particular distance or direction from the merge candidate (e.g., by finding the best_d direction) and by identifying a set of refinement positions that neighbor the particular refinement position as the possible candidate prediction positions. The particular distance or direction may be provided by a video decoder in the bitstream.

The decoder computes (at block 1930) a cost for each of the identified possible candidate prediction positions. The cost of a candidate prediction position may be computed by matching a template of the current block and a template of a reference block that is referenced by the candidate prediction position. The template of a pixel block includes pixels to the top and to the left of the pixel block.

The decoder assigns (at block 1940), based on the computed costs, a reordered index to each of N lowest cost candidate prediction positions from the identified possible candidate prediction positions. In some embodiments, N is a number greater than one but less than a total number of the identified possible candidate prediction positions such that only a subset of the possible candidate prediction positions identified, thereby reducing the number of bits needed for coding or signaling.

The decoder selects (at block 1950) a candidate prediction position using the assigned reordered indices, wherein the selection is parsed from the bitstream. In some embodiments in which the candidate prediction positions are refinement positions of MMVD, the selection signaled in the bitstream may specify a reordered index for the distance or a reordered index for the direction.

The decoder reconstructs (at block 1960) the current block by using the selected candidate prediction position. Specifically, the selected candidate prediction position or refinement position is used to derive the MV for obtaining the prediction data to reconstruct the current block.

In some embodiments, the selection being signaled includes (i) a group index specifying a selected group of a plurality of groups of candidate refinement positions and (ii) one or more indices specifying a selected candidate refinement position within the selected group. FIG. 12 above illustrates an example in which all of the identified possible candidate prediction positions belong to the selected group of candidate refinement positions. The reordered indices are assigned to N lowest cost candidate refinement positions of the selected group, and the one or more indices specifying the selected candidate refinement position within the selected group include a reordered index. The different groups of candidate refinement positions may have different numbers of member candidate refinement positions. FIG. 13 above illustrates an example in which each identified possible candidate prediction position is a representative candidate refinement position of a different group of candidate refinement positions. The reordered indices are assigned to N groups respectively having N lowest cost representative candidate refinement positions, N being less than or equal to a total number of groups in the plurality of groups of candidate refinement positions. The group index specifying the selected group of candidate refinement positions is a reordered index. Each group in the multiple groups of candidate refinement positions has a same numbers of member candidate refinement positions.

V. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 20:
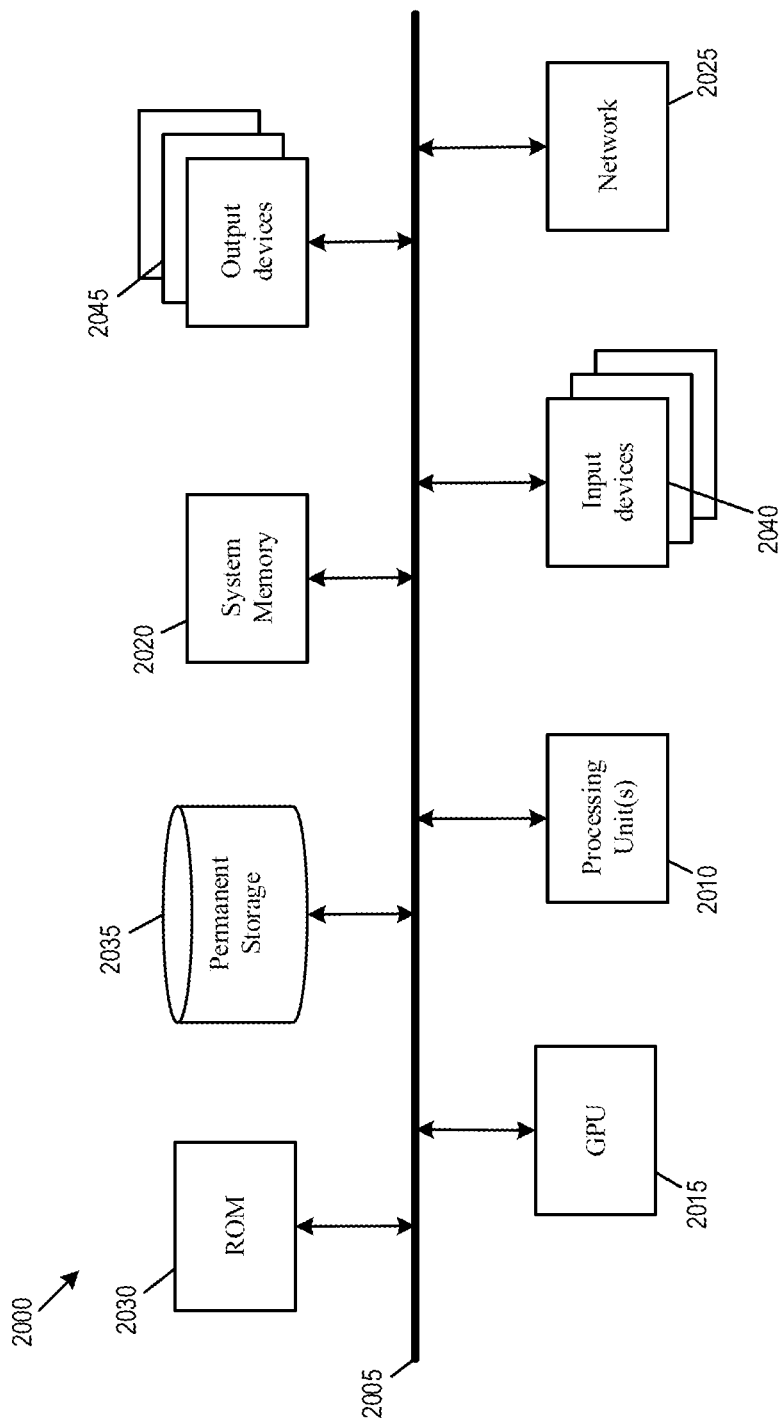
FIG. 20 conceptually illustrates an electronic system with which some embodiments of the present disclosure are implemented.

FIG. 20 conceptually illustrates an electronic system 2000 with which some embodiments of the present disclosure are implemented. The electronic system 2000 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 2000 includes a bus 2005, processing unit(s) 2010, a graphics-processing unit (GPU) 2015, a system memory 2020, a network 2025, a read-only memory 2030, a permanent storage device 2035, input devices 2040, and output devices 2045.

The bus 2005 collectively represents all system, peripheral, and chipset buses that communicatively connect the numerous internal devices of the electronic system 2000. For instance, the bus 2005 communicatively connects the processing unit(s) 2010 with the GPU 2015, the read-only memory 2030, the system memory 2020, and the permanent storage device 2035.

From these various memory units, the processing unit(s) 2010 retrieves instructions to execute and data to process in order to execute the processes of the present disclosure. The processing unit(s) may be a single processor or a multi-core processor in different embodiments. Some instructions are passed to and executed by the GPU 2015. The GPU 2015 can offload various computations or complement the image processing provided by the processing unit(s) 2010.

The read-only-memory (ROM) 2030 stores static data and instructions that are used by the processing unit(s) 2010 and other modules of the electronic system. The permanent storage device 2035, on the other hand, is a read-and-write memory device. This device is a non-volatile memory unit that stores instructions and data even when the electronic system 2000 is off. Some embodiments of the present disclosure use a mass-storage device (such as a magnetic or optical disk and its corresponding disk drive) as the permanent storage device 2035.

Other embodiments use a removable storage device (such as a floppy disk, flash memory device, etc., and its corresponding disk drive) as the permanent storage device. Like the permanent storage device 2035, the system memory 2020 is a read-and-write memory device. However, unlike storage device 2035, the system memory 2020 is a volatile read-and-write memory, such a random access memory. The system memory 2020 stores some of the instructions and data that the processor uses at runtime. In some embodiments, processes in accordance with the present disclosure are stored in the system memory 2020, the permanent storage device 2035, and/or the read-only memory 2030. For example, the various memory units include instructions for processing multimedia clips in accordance with some embodiments. From these various memory units, the processing unit(s) 2010 retrieves instructions to execute and data to process in order to execute the processes of some embodiments.

The bus 2005 also connects to the input and output devices 2040 and 2045. The input devices 2040 enable the user to communicate information and select commands to the electronic system. The input devices 2040 include alpha-numeric keyboards and pointing devices (also called "cursor control devices"), cameras (e.g., webcams), microphones or similar devices for receiving voice commands, etc. The output devices 2045 display images generated by the electronic system or otherwise output data. The output devices 2045 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 20, bus 2005 also couples electronic system 2000 to a network 2025 through a network adapter (not shown). In this manner, the computer can be a part of a network of computers (such as a local area network ("LAN"), a wide area network ("WAN"), or an Intranet, or a network of networks, such as the Internet. Any or all components of electronic system 2000 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 16 and FIG. 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method comprising:
    receiving data from a bitstream for a block of pixels to be decoded as a current block of a current picture of a video;
    identifying possible candidate prediction positions, wherein each candidate prediction position is a refinement position that refines a merge candidate by specifying a direction and a distance relative to the merge candidate, wherein identifying the possible candidate prediction positions comprises:
    finding a particular refinement position having a lowest cost among refinement positions at a particular distance or direction from the merge candidate; and
    identifying a set of refinement positions that neighbor the particular refinement position as the possible candidate prediction positions;
    computing a cost for each of the identified possible candidate prediction positions;
    assigning, based on the computed costs, a reordered index to each of N lowest cost candidate prediction positions from the identified possible candidate prediction positions;
    selecting a candidate prediction position using the assigned reordered indices, wherein the selection is parsed from the bitstream; and
    reconstructing the current block by using the selected candidate prediction position.

2. The video decoding method of claim 1, wherein N is a number less than a total number of the identified possible candidate prediction positions.

3. The video decoding method of claim 1, wherein the cost of a candidate prediction position is computed by matching a template of the current block and a template of a reference block that is referenced by the candidate prediction position.

4. The video decoding method of claim 1, wherein the selection parsed from the bitstream specifies a reordered index for the distance or a reordered index for the direction.

5. The video decoding method of claim 1, wherein the particular distance or direction is parsed from the bitstream.

6. The video decoding method of claim 1, wherein the selection being parsed comprises (i) a group index specifying a selected group of a plurality of groups of candidate refinement positions and (ii) one or more indices specifying a selected candidate refinement position within the selected group.

7. The video decoding method of claim 6, wherein all of the identified possible candidate prediction positions belong to the selected group of candidate refinement positions.

8. The video decoding method of claim 7, wherein the reordered indices are assigned to N lowest cost candidate refinement positions of the selected group, wherein the one or more indices specifying the selected candidate refinement position within the selected group comprise a reordered index.

9. The video decoding method of claim 7, wherein at least two different groups of candidate refinement positions have different numbers of member candidate refinement positions.

10. The video decoding method of claim 6, wherein:
    each identified possible candidate prediction position is a representative candidate refinement position of a different group of candidate refinement positions;
    the reordered indices are assigned to N groups respectively having N lowest cost representative candidate refinement positions, N being less than or equal to a total number of groups in the plurality of groups of candidate refinement positions; and
    the group index specifying the selected group of candidate refinement positions is a reordered index.

11. The video decoding method of claim 10, wherein each group in the plurality of groups of candidate refinement positions has a same numbers of member candidate refinement positions.

12. An electronic apparatus comprising:
    a video decoder circuit configured to perform operations comprising:
    receiving data from a bitstream for a block of pixels to be decoded as a current block of a current picture of a video;
    identifying possible candidate prediction positions, wherein each candidate prediction position is a refinement position that refines a merge candidate by specifying a direction and a distance relative to the merge candidate, wherein identifying the possible candidate prediction positions comprises:
    finding a particular refinement position having a lowest cost among refinement positions at a particular distance or direction from the merge candidate; and
    identifying a set of refinement positions that neighbor the particular refinement position as the possible candidate prediction positions;
    computing a cost for each of the identified possible candidate prediction positions;
    assigning, based on the computed costs, a reordered index to each of N lowest cost candidate prediction positions from the identified possible candidate prediction positions;
    selecting a candidate prediction position using the assigned reordered indices, wherein the selection is parsed from the bitstream; and
    reconstructing the current block by using the selected candidate prediction position.

13. A video coding method comprising:
    receiving data for a block of pixels to be encoded or decoded as a current block of a current picture of a video;
    identifying possible candidate prediction positions, wherein each candidate prediction position is a refinement position that refines a merge candidate by specifying a direction and a distance relative to the merge candidate, wherein identifying the possible candidate prediction positions comprises:

finding a particular refinement position having a lowest cost among refinement positions at a particular distance or direction from the merge candidate; and identifying a set of refinement positions that neighbor the particular refinement position as the possible candidate prediction positions;

computing a cost for each of the identified possible candidate prediction positions;

assigning, based on the computed costs, a reordered index to each of N lowest cost candidate prediction positions from the identified possible candidate prediction positions;

selecting a candidate prediction position using the assigned reordered indices, wherein the selection is signaled in or parsed from the bitstream; and encoding or decoding the current block by using the selected candidate prediction position.

* * * * *